Nov. 2, 1971 G. J. HARRIS 3,616,791

ELECTROCARDIOGRAPHIC MORPHOLOGY RECOGNITION SYSTEM

Filed April 30, 1969 13 Sheets-Sheet 1

INVENTOR.
GEORGE J. HARRIS

BY William C. [signature]
ATTORNEYS

ELECTROCARDIOGRAPHIC MORPHOLOGY RECOGNITION SYSTEM
Filed April 30, 1969 13 Sheets-Sheet 2
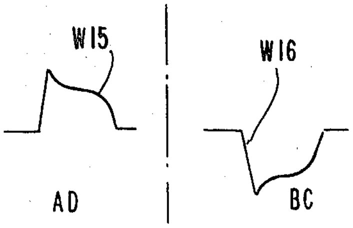
FIG. 2
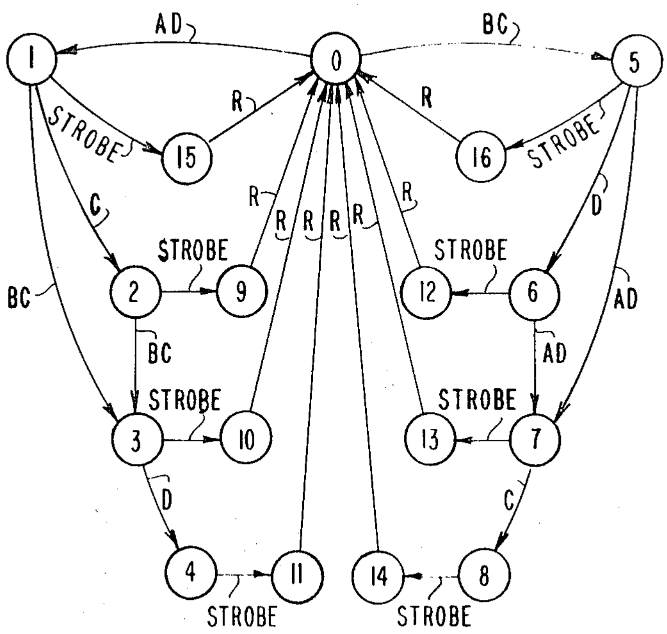
FIG. 3
| STATE | F/F-1 | F/F-2 | F/F-3 | F/F-4 |
|---|---|---|---|---|
| 0 | 0 | 0 | 0 | 0 |
| 1 | 1 | 0 | 0 | 0 |
| 2 | 1 | 1 | 0 | 0 |
| 3 | 1 | 1 | 1 | 0 |
| 4 | 1 | 1 | 1 | 1 |
| 5 | 0 | 0 | 0 | 1 |
| 6 | 0 | 0 | 1 | 1 |
| 7 | 0 | 1 | 1 | 1 |
| 8 | 0 | 1 | 1 | 0 |
| 9 | STATE 2 · STROBE | | | |
| 10 | STATE 3 · STROBE | | | |
| 11 | STATE 4 · STROBE | | | |
| 12 | STATE 6 · STROBE | | | |
| 13 | STATE 7 · STROBE | | | |
| 14 | STATE 8 · STROBE | | | |
| 15 | STATE 1 · STROBE | | | |
| 16 | STATE 5 · STROBE | | | |
FIG. 4
INVENTOR
GEORGE J. HARRIS
BY William C. Nealon
ATTORNEY INVENTOR
GEORGE J HARRIS
BY William C. [signature]
ATTORNEY INVENTOR
GEORGE J. HARRIS
BY William C. [signature]
ATTORNEY

ELECTROCARDIOGRAPHIC MORPHOLOGY RECOGNITION SYSTEM

Filed April 30, 1969 13 Sheets-Sheet 5

INVENTOR
GEORGE J. HARRIS
BY William C. Nealon
ATTORNEY

INVENTOR
GEORGE J. HARRIS
BY William C. Nealon
ATTORNEY

ELECTROCARDIOGRAPHIC MORPHOLOGY RECOGNITION SYSTEM

INVENTOR
GEORGE J. HARRIS
BY William C. Nealon
ATTORNEY

INVENTOR
GEORGE J. HARRIS
BY William C. Nealon
ATTORNEY

INVENTOR
GEORGE J. HARRIS
BY William Clark
ATTORNEY

ELECTROCARDIOGRAPHIC MORPHOLOGY RECOGNITION SYSTEM

Filed April 30, 1969 13 Sheets-Sheet 10

INVENTOR
GEORGE J. HARRIS
BY
William C Nealon
ATTORNEY

INVENTOR
GEORGE J. HARRIS
BY
ATTORNEY

ATTORNEY
GEORGE J. HARRIS
BY William C. Nealon
ATTORNEY

ELECTROCARDIOGRAPHIC MORPHOLOGY RECOGNITION SYSTEM

INVENTOR
GEORGE J. HARRIS
BY William C. Nealon
ATTORNEY

1

3,616,791
ELECTROCARDIOGRAPHIC MORPHOLOGY RECOGNITION SYSTEM
George J. Harris, Framingham, Mass., assignor to American Optical Corporation, Southbridge, Mass.
Filed Apr. 30, 1969, Ser. No. 820,554
Int. Cl. A61b 5/04
U.S. Cl. 128—2.06 A 58 Claims

ABSTRACT OF THE DISCLOSURE

An electrocardiographic monitoring system which recognizes QRS complexes, their rhythm and morphologies. The morphologies of the QRS complexes are memorized during a learning interval at the start of monitoring. Thereafter, different morphologies are identified as abnormal. Each QRS complex is recognized by differentiating it, forming various product signals of itself and its derivative, and registering the sequence in which the various product signals exceed and fall below threshold values. The system also continuously updates a 10-second average of the R-R interval in order to identify premature and late beats, and compensatory pauses.

This invention relates to electrocardiographic monitoring system, and more particularly to such systems which automatically detect abnormal ECG waveforms.

It is common today, in the intensive care units of many hospitals, to monitor continuously the ECG signal of a cardiac patient. It is, of course, impractical to station continuously a doctor or a trained nurse at the bedside of the patient for the purpose of observing a trace of the ECG signal on a scope. In some cases, what is done instead is to produce a continuous trace of the ECG signal for periodic review by trained personnel. However, this is also impractical not only because of the high cost but also because the trace requires a considerable amount of time for its review. It has been suggested to overcome these problems by triggering a short trace only when an abnormality in the ECG signal is detected. Various relatively unsophisticated systems have been proposed in the prior art for determining such abnormalities, e.g., heartbeat rate detection circuits, etc.

One of the main difficulties in the design of any system of this type is that the "normal" ECG signal varies from patient to patient. Most normal ECG waveforms include P, Q, R, S and T waves, the QRS complex containing most of the useful information. But the waveform varies widely from patient to patient and each patient can have a different "normal" electrocardiogram. It is for this reason that it is exceedingly difficult to design equipment which can detect "abnormal" heartbeats. Except for certain very pronounced conditions, there is no such thing as a typical abnormality for all patients.

The problem is not only with the shape of ECG waveform. There is also no such thing as a normal "timing" of the ECG pulses. (Of course, a normal range can be defined for all patients, but when a patient is to be closely monitored it is best to detect deviations from his particular norm, rather than rates outside the much broader normal range.) The time periods which make a pulse "premature" or "late" vary not only from patient to patient, but from time to time with the same patient as well. What is important wih respect to the timing of the ECG signal of any individual patient is that deviations from the norm for that particular time of day be detected, rather than deviations from a broad range which may characterize the beating of the patient's heart over a relatively long period of time.

2

Similarly, the timing and shape of a patient's ECG signal may be normal, yet the width (the integral of the rectified waveform) of any signal waveform may be excessive. Again, the normal width of the waveform varies not only from patient to patient, but from time to time with the same patient. All of these factors make it exceedingly difficult to design a system which is satisfactorily detects abnormalities in the ECG signal of a patient.

It is a general object of this invention to overcome the aforesaid problems with the provision of an electrocardiographic morphology recognition system which is capable of learning the "normal" characteristics of any patients ECG signal, and which thereafter detects deviations from the learned characteristics and controls the appropriate alerting actions.

In the illustrative embodiment of my invention, the ECG signal from the patient is recorded on a two-second endless tape belt as is known in the art. Whenever an abnormal signal is detected, the two previous seconds of the ECG signal are recorded on a trace together with the ECG signal during the next second. Such arrangements are well known in the art. My invention pertains to the circuitry for enabling the system to learn the normal patterns and then to automatically respond to deviations from them.

The first learning/detecting sub-system pertains to the shape of the QRS complex of each ECG waveform. The ECG signal is differentiated and various analog functions of the ECG signal and its derivative are developed. A set of flip-flops is provided to define the system state. The flip-flops cycle from an initial state during the period of each heartbeat. The instantaneous system state depends both on the previous system state and the instantaneous values of the analog functions formed from the ECG signal. The final system state is in effect a representation of the sequence of the function values, which sequence is in turn a function of the shape of the QRS complex.

During a 15-second learning interval, the system registers all of the final states which are developed for the individual ECG waveforms occurring during the interval, except those associated with premature beats. Thereafter, the system compares the final state represented by the series of flip-flops with the final states included in the learned patterns. If any ECG waveform results in a final state which is not one of those previously registered (or "learned"), it is an indication that the morphology of the waveform is of interest to the cardiologist, and a 3-second trace is made.

The system is designed to learn eight different final system states and to detect subsequent deviations from them. The state sequencing has been designed to terminate in a respective state for each of eight function value sequences which correspond to respective relatively common ECG waveshapes. While these waveshapes are the most frequent, they are by no means universal. It is to be expected that in some patients the "normal" ECG waveshapes will be considerably different from all of those in mind when the state sequencing was designed. This is of no consequence. The flip-flops still cycle in accordance with the instantaneous values of the analog functions, and during the 15-second learning process the system still ends up in several final system states which can be considered normal for that patient. Thereafter, if any final system state is different from all of those previously learned, an abnormality is detected to control the trace. Thus, it is not necessary to pre-program the system with every conceivable ECG waveform. All that is necessary is to provide a mechanism for analyzing the ECG signal and to enable the system to remember the results of the analysis during the learning process. Subsequent different results are treated as abnormal.

As described above, it is not possible for the system to learn a "normal" timing sequence even for any individual patient because the normal time separation of the pulses for any patient can vary from time to time. The important criterion is a deviation from the average time separation over the preceding few beats. A circuit is provided to determine the average time separation between heartbeats. The instantaneous time separation between successive pulses is then monitored and deviations by more than pre-set percentages from the average time separation result in indications of premature beats, late beats and compensatory pauses. These deviations from the continuously learned normal (or average) timing sequence can be programmed to trigger the 3-second trace.

Similar remarks apply to the width measurement. The widths of a few successive waveforms are continuously averaged and an instantaneous deviation from it can be programmed to trigger the trace.

Depending on the condition of the patient, the cardiologist may desire a trace only for particular types of abnormalities. For example, he may want to examine the ECG signal only following a late pulse, or only following a premature beat, or only following an abnormal waveshape, or any combination of these, etc. A set of switches is provided to pre-program the system to control the trace following the detection only of an abnoramlity of interest to the cardiologist. A counter is also provided to count the number of ventricular premature beats so that this information is available even if the cardiologist does not pre-program the system to generate any traces.

Further objects, features and advantages of my invention will become apparent upon a consideration of the following detailed description in conjunction with the drawings, in which:

FIG. 2 illustrates two additional waveforms which may occur in some ventricular premature beats;

FIG. 3 is a state diagram illustrating the sequencing of the system state in accordance with the sequencing of the function inputs of FIG. 1;

FIG. 4 is a table showing the relationship of the states of the four individual flip-flops which together define the system state;

Figure 1:
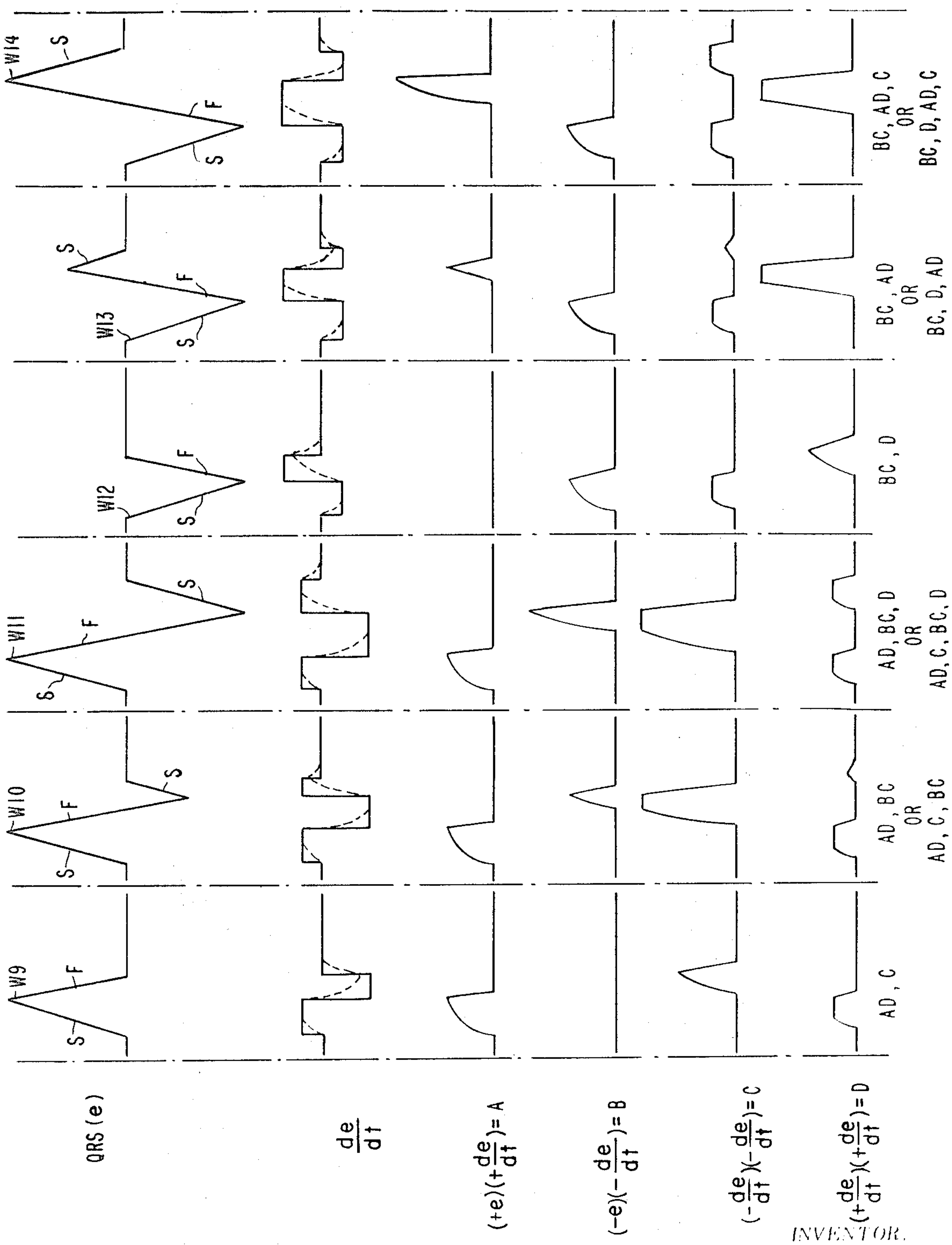
FIG. 1 illustrates six typical QRS waveforms and the analog functions derived therefrom in the illustrative embodiment of the invention, and further depicts the timing sequence of the functions which determine the final system state for each of the six QRS waveforms.

FIGS. 1 and 2—eight typical QRS waveforms and the functions derived therefrom for controlling the cycling of the system state The top line of FIG. 1 illustrates six typical QRS waveshapes W9 through W14, each being a part of the overall ECG signal, *e*. The suffixes 9 through 14 correspond to the final system states 9 through 14 to be described below. For example, with a QRS waveform having the shape of W11, the system ends up in state 11.

Each of the straight-line segments which partially defines one of the waveforms W9 through W14 is identified by the letter S or F. The former represents a slow-rising or slow-falling segment, i.e., a small slope. The latter represent a fast-rising or fast-falling segment, i.e., a large slope. Waveforms W9 through W11 and W12 through W14 are two complementary sets, with individual pairs of the waveforms being of opposite polarities. For example, waveforms W9 and W12 have the same shape but are inverted with respect to each other.

The second line in FIG. 1 shows the derivative *de/dt* of each of the QRS waveforms W9 through W14. The magnitude of the derivative of each F line segment is twice the magnitude of the derivative of each S line segment, since the derivative of each waveform is simply the magnitude of the slope of the waveform at any time. The polarity of the derivative of any waveform is positive when the slope of the waveform is positive, and is negative when the slope of the waveform is negative.

The waveforms illustrated at the top of FIG. 1 are "theoretical" in that a typical QRS waveform does not consist wholly of straight-line segments. Therefore, the derivatives shown in the second line of FIG. 1 are also theoretical. In actual practice, the QRS waveforms and their derivatives have curved portions. The dotted curves in the second line of FIG. 1 show the shapes of the functions which are actually derived in practice. The curved portions of the derivative functions correspond to curved portions in the actual QRS waveforms. For an understanding of the invention it is not necessary to analyze the actual waveforms seen in practice. As discussed above, for each QRS waveform the system ends up in a particular final system state. During the 15-second learning process, the final states which are registered correspond to the normal waveforms, whatever they are. Thereafter, final system states which do not correspond to those previously learned represent abnormalities. Theoretical waveforms are easier to understand than those actually found in practice, and in no way detract from an understanding of the invention itself.

The third set of waveforms in FIG. 1 show the product of each QRS waveform and its derivative for each of cases W9 through W14. The two "plus" signs in the function to the left of the diagram indicate that the product A which is formed only takes into account the positive portions of any waveform and its derivative. Thus, in the case of waveform W12 which is never positive, the product must necessarily be zero at all times. Each of the functions in the third line of FIG. 1 is positive only when both of its two factors are positive, and the instantaneous magnitude of the product is dependent on the magnitudes of both the waveform and its derivative. The various products which are shown in FIG. 1 are derived from the waveforms themselves and the "actual" derivatives shown by the dotted curves in the second line of the diagram.

The fourth set of waveforms have a similar interpretation except that only the negative portions of the ECG waveforms and their derivatives contribute to the output B. Only if both of the two input functions *e* and *de/dt* are negative is an output produced.

The multiplier which produces the C function, shown in the fifth line of FIG. 1, has as both of its two inputs the derivative of the ECG signal. However, only the negative portions of the derivative are considered, i.e., the C function is non-zero only when *de/dt* is negative. Similarly, the D function, produced by a fourth multiplier, operates only on the positive portion of the derivative.

At the bottom of each column there is shown the sequence in which the various multiplier outputs (A, B, C and D) go positive. In the case of waveform W9, functions A and D go positive together, and are followed by function C. This is shown by the notation AD,C.

In the case of waveform W10, A and D pulses are produced together, followed by B and C pulses produced together. This condition is shown as AD,BC. However, it is possible for the C multiplier output to go positive shortly before the B multiplier output, the situation actually shown in the drawing. For this reason, a second possible sequence is shown for waveform W10, namely, AD,C,BC. First, A and D go positive together, then C, followed by C together with B. It should be noted that in the case of waveform W10 there is a small D output toward the end of the sequence. However, the magnitude of the D output is not sufficient for the gates in the system to respond to it. For this reason, the D function is not included in either of the function sequences for the case of waveform W10.

In the case of waveform W11, the A and D signals are produced together, followed by the B and C signals, followed by the D signal. The sequence is shown at the bottom of the third column as AD,BC,D. However, it is possible for the C signal to go positive slightly before the B signal, as actually shown in the drawing. For this reason the alternative sequence AD,C,BC,D is also shown for waveform W11.

The sequences for waveforms W12 through W14 have similar interpretations. It should be noted that while waveforms W12 through W14 are the inverse of waveforms W9 through W11, the function sequences for the pairs of waveforms are not related. It is for this reason that the system has been designed to take into account all six waveforms, rather than only three of them.

FIG. 2 shows two additional QRS waveshapes, W15 and W16, which may occasionally occur in some ventricular premature beats (VPB's). The early part of each of these complexes is similar to that of W9 or W12, but the later part of each complex is much slower than that of W9 or W12. The morphology detection circuit to be described below can detect the A and D functions going positive at the beginnng of waveform W15 (the first part of waveform W15 is similar to waveform W9 so that the A and D functions can be generated in both cases at the beginning of the waveforms), or the B and C functions going positive at the beginning of waveform W16 (the first part of waveform W16 is similar to waveform W12 so that the B and C functions can be generated in both cases at the beginning of the waveforms). Each of the C and D multipliers has two inputs—either positive derivatives or negative derivatives. If the late portion of the waveform is slow, the derivative in each case will be small. Consequently, it is possible that following AD an undetectable output will be generated from multiplier C, or that following BC an undetectable multiplier output will be generated from multiplier D. The system is designed to register the first of these conditions (W15—A and D together, followed by undetectable C), or the second (W16—B and C together, followed by undetectable D). The system has a total of eight final system states 9 through 16 corresponding to the six waveforms W9 through W14, and the two waveforms W15 and W16.

FIG. 3 is a state diagram which shows the progression of the system state from state 0 (following a reset pulse prior to each heartbeat) to one of the final states 9 through 16. If the system receives an AD input (that is, the outputs of the two multipliers which generate the A and D functions are energized together), the system jumps from state 0 to state 1. If a C input is then received, the system moves from state 1 to state 2. If the next input is BC, the system moves to state 3. Alternatively, if the system is in state 1 and a BC input is applied, the system jumps from state 1 to state 3. This sequence insures that the system cycles to state 3 for waveform W10 (see FIG. 1) whether or not the C input is actually received before the B input. If the system is in state 3 and a D input is received, it moves to state 4.

The left side of the state diagram shows the cycling of the system state for wave forms W9, W10, W11 and W15. In the case of waveform W15, there is only an AD input and the system state cycles to state 1. In the case of waveform W9, where there are only AD and C inputs, the system cycles to state 2. For waveform W10, where the inputs are AD,BC or AD,C,BC, the system cycles to state 3. The input sequence for waveform W11 is the same as that for waveform W10 except that there is an additional D input at the end of the sequence. For the W11 waveform, the system goes to state 4 rather than remaining in state 3.

Similarly, for waveforms W16, W12, W13, and W14, the system cycles to respective states 5, 6, 7 and 8, as shown in FIG. 3.

With the system sitting in one of states 1–8, if a strobe pulse is generated, the system jumps to one of terminal states 9 through 16 (corresponding to wave forms W9 through W16) as shown in the state diagram of FIG. 3. In case the only input sequence was AD, the system moves from state 0 to state 1 and remains in state 1. In such a case, the strobe pulse causes the system to jump to state 15 (since for waveform W15 of FIG. 2 an AD combination can be generated). Similarly, if the only input sequence was BC, the system is in state 5 when the strobe pulse is applied and it ends up in state 16 (since for waveform W16 of FIG. 2 a BC combination can be generated).

Terminal states 9 through 16 are used during both the learning and monitoring sequences. It is the terminal states which are first learned that are later used during monitoring to determine if an abnormal waveform has been detected. At all times, after the necessary information has been determined from one of the terminal states 9 through 16, a reset (R) pulse resets the system and causes it to revert to state 0 preparatory to examination of the next ECG waveform.

FIG. 4 shows the states of four flip-flops F/F–1 through F/F–4 for each of the system states 0 through 8. These flip-flops will be described in detail below. The states of the flip-flops do not change to represent terminal states 9 through 16. The system jumps to (or, more accurately, simply verifies the existence of) terminal state 15, as indicated in the table of FIG. 4, if it is in state 1 when the strobe pulse is generated. Similar remarks apply to intermediate states 2 through 8 and terminal states 9 through 14 and 16. The table of FIG. 4 is an alternative way to define the state diagram of FIG. 3. Both figures will be considered below in the detailed description of waveform recognition circuit 50.

Figure 7:
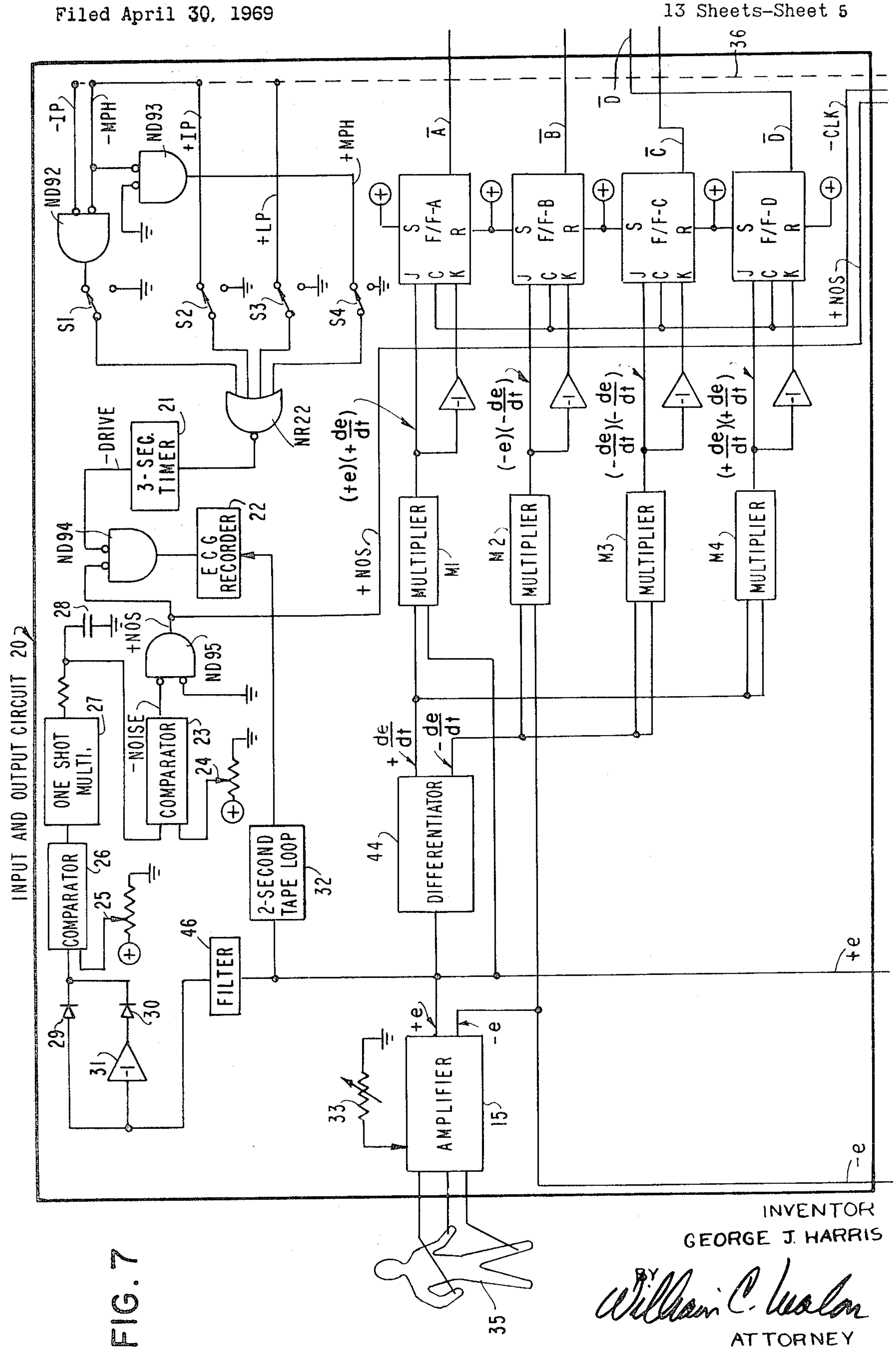
FIGS. 7–12B illustrate schematically an illustrative embodiment of my invention.

FIG. 7—input and output circuit—Part I

Patient 35 is connected in the usual manner to a conventional electrocardiographic amplifier 15. The gain of the amplifier can be controlled by potentiometer 33 as is known in the art. The amplifier produces two ECG output signals, identical except for their opposite polarities. The positive output signal, $+e$, is extended to the input of magnetic tape recorder (tape loop) 32 so that a delayed, 2-second display of the patient's ECG signal is available. The output of recorder 32 is extended to the input of ECG trace recorder 22. When gate ND94 operates, as will be described below, a 3-second trace of the ECG signal is made. The gate operates after it is determined that the previous heartbeat or heartbeats were different from normal beats and should be recorded. For this reason, the $+e$ signal is recorded on a 2-second tape loop in recorder 32, as is known in the art. When gate ND94 operates, the two seconds of the past ECG signal are recorded on the trace recorder 22 followed by the next second of the signal.

Input and output circuit 20 includes a noise detector circuit. The $+e$ output of amplifier 15 is extended through high-pass filter 46 (to attentuate relatively low frequencies) to both diode 29 and amplifier 31 having a gain of —1. The amplified output is applied to diode 30. The signal at the junction of the two diode cathodes is thus a fully rectified ECG signal, and the signal is fed to one input of comparator 26. Potentiometer tap 25 is connected to the other input of the comparator. As long as the rectified ECG signal at the one input of the comparator is lower in magnitude than the voltage on tap 25, the comparator output is high. However, when the rectified ECG signal goes above the threshold voltage, the comparator output goes low. Every time the comparator output goes low, one-shot multivibrator 27 is triggered. The multivibrator is triggered a number of times equal to the number of times the rectified ECG signal voltage goes above the voltage threshold level. The rate of operation of the multivibrator is thus proportional to the rate of the threshold crossings of the rectified ECG signal.

Each multivibrator pulse delivers a charging current to capacitor 28. The voltage across the capacitor is thus proportional to the average number of times the multivibrator is triggered.

One input of comparator 23 is connected to potentiometer tap 24. The other input is connected to capacitor 28. The —NOISE output conductor is normally held at a high potential by the comparator. However, when the voltage across capacitor 28 exceeds the voltage on tap 24, the comparator output goes low. Potentiometer tap 24 is adjusted to a level corresponding to the maximum noise threshold. In the presence of excessive noise, i.e., a high frequency content in the ECG signal, the voltage across capacitor 28 exceeds the threshold level and the —NOISE conductor goes low. Gate ND95 operates to cause conductor +NOS to go positive. (The operation of an ND gate is described in the next section.) This conductor is connected to one input of gate ND94, and when it is positive it prevents the gate from triggering the 3-second trace even if the remaining circuitry detects a requirement for a trace. In the presence of excessive noise a trace is not made. Conductor +NOS is also extended to morphology detector circuit 60 to prevent the operations of gates ND72 and ND96 in the presence of noise, as will be described below.

The $+e$ output of amplifier 15 is extended to the input of R-way detector 69 in timing control circuit 30. The R-wave detector detects the downward sloping portion of the QRS complex in each ECG waveform, and its operation, together with the operation of the timing control circuit, will be described below.

The $+e$ output of amplifier 15 is also extended to the input of differentiator 44. The output of the differentiator is the derivative of the ECG signal, and two opposite polarity signals are developed as shown. These signals are extended to the inputs of the four multipliers M1 through M4, as are the $+e$ and $-e$ signals themselves. Consequently, the multipliers, between them, can form the four function products depicted to the left sides of the four lowest waveform diagrams in FIG. 1. These outputs of the multipliers are indicated on FIG. 7. Each multiplier output is grounded or positive only—and it is positive only when both input signals to the multiplier are positive.

The output of each multiplier is connected to the J input of a respective one of flip-flops F/F–A through F/F–D. The output of each multiplier is also inverted by a respective inverter and the inverted signal is applied to the K input of the respective flip-flop.

Clock 53 in timing control circuit 30 operates at a 20 kHz. rate. The clock generates a succession of square-wave pulses. The output of the clock on conductor —CLK is connected to the C (clock) input of each of flip-flops F/F–A through F/F–D. It is only the negative step of each clock pulse which can trigger a change of state of any flip-flop. In general, various conductors in the drawings are identified by a letter sequence preceded by a "+" or "—" sign. A "+" designation indicates that when the conductor goes high in potential, the signal controls certain switching functions in the system. Similarly, a "—" designation indicates that when the conductor goes low in potential, the signal controls certain switching functions in the system. It is a negative step on conductor CLK which controls various switching functions in the system and thus the CLK notation is preceded by a "—" sign.

The system includes various J–K flip-flops. If the J input of one of these flip-flops is high and the K input low, the negative clock pulse causes the flip-flop to be set. (Thus, for example, if the output of multiplier M1 goes positive, the next clock pulse causes output conductor A of flip-flop F/F–A to go high and output conductor $\overline{A}$ to go low.) If the J input of a flip-flop is low and the K input is high when a clock pulse is generated, the flip-flop is reset with the output conductors switched to the opposite polarities. (Thus, for example, if the output of multiplier M1 goes to zero, the J input of flip-flop F/F–A is low and the K input is high, and the next clock pulse causes the flip-flop to be reset with conductor A going low and conductor $\overline{A}$ going high.) If the J and K inputs of a J–K flip-flop are both high, the flip-flop changes state when a clock pulse is generated. (Since the J and K inputs of flip-flops F/F–A through F/F–D are always of opposite polarities, the "both high" condition does not arise.) If both the J and K inputs of a J–K flip-flop are low when a clock pulse is generated, the state of the flip-flop is unaffected. (This condition is also not possible in the case of flip-flops F/F–A through F/F–D since the J and K inputs of each flip-flop are always of opposite polarities.) Each J–K flip-flop is also provided with set (S) and reset (R) terminals. Considering any flip-flop with two output conductors F and $\overline{F}$, if the reset terminal is low the flip-flop is reset with conductor F going low and conductor $\overline{F}$ going high. Conversely, if the set input is low, the F conductor goes high and the $\overline{F}$ conductor goes low. The operation of the set and reset inputs is independent of the state of the clock input. (In the case of each of flip-flops F/F–A through F/F–D, the set and reset terminals are both connected to positive potentials and the flip-flops are unaffected by the set and reset inputs.)

With respect to each of flip-flops F/F–A through F/F–D there are only two possible inputs. Either the J input is high and the K input is low, or vice versa. (By "high" is meant a multiplier output high enough to affect the state of the flip-flop.) In the former case, the next clock pulse to arrive sets the flip-flop with the upper output conductor of the flip-flop going high and the lower output conductor going low. Thereafter, the flip-flop remains set as succeeding clock pulses are generated. When the respective multiplier output goes to zero, the J input goes low and the K input goes high, and the next clock pulse causes the flip-flop to reset. The clock pulses are applied at such a rapid rate that the flip-flop states almost instantaneously represent the positive or zero outputs of the respective multipliers. In the description below, the inputs to recognition logic circuit 50 are indentified as A, B, C and D. An A input, for example, is that where conductor A is high and conductor $\overline{A}$ is low, i.e., flip-flop F/F–A is in the set state as a result of the output of multiplier M1 going positive.

Figure 11A:
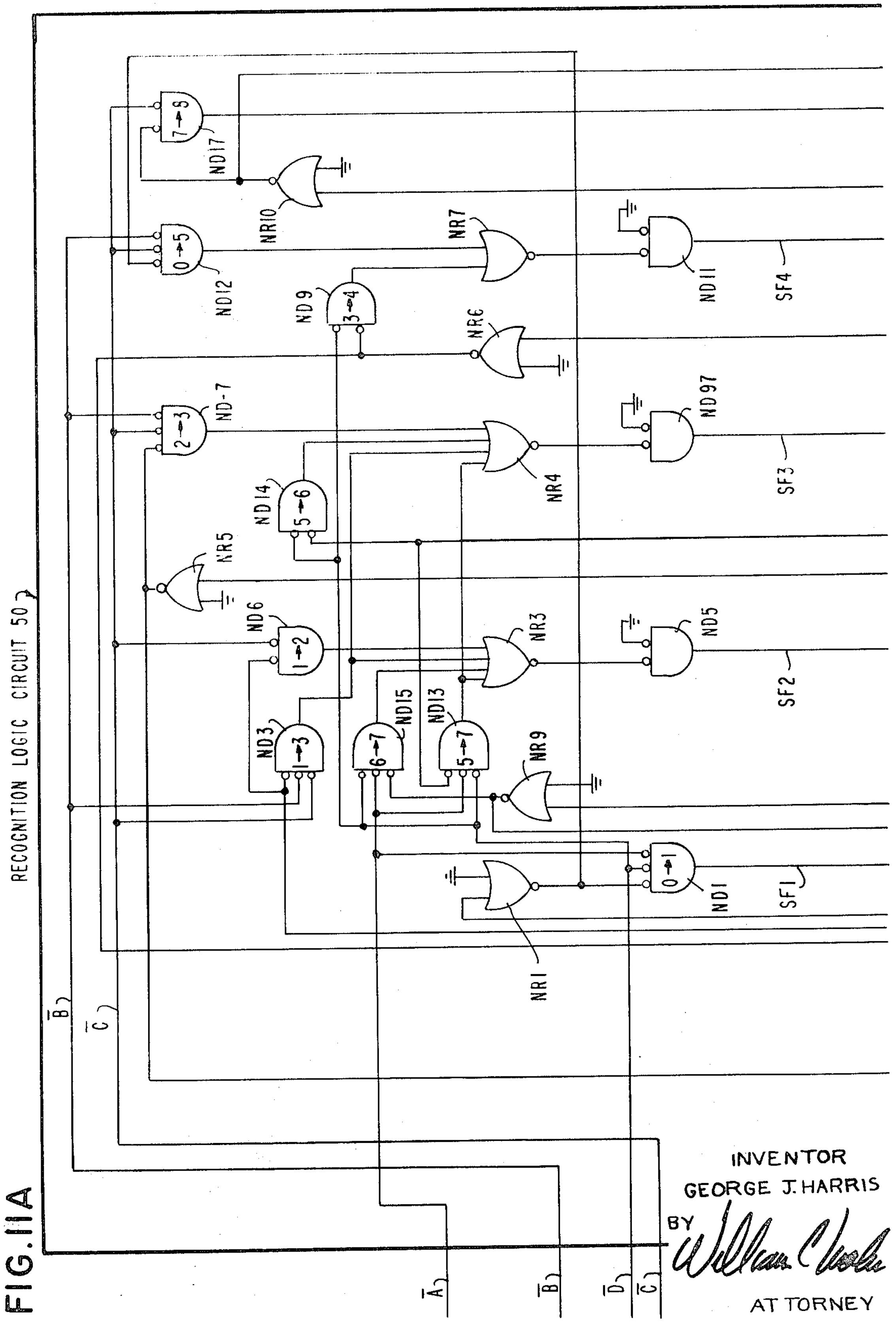
Figure 11B:
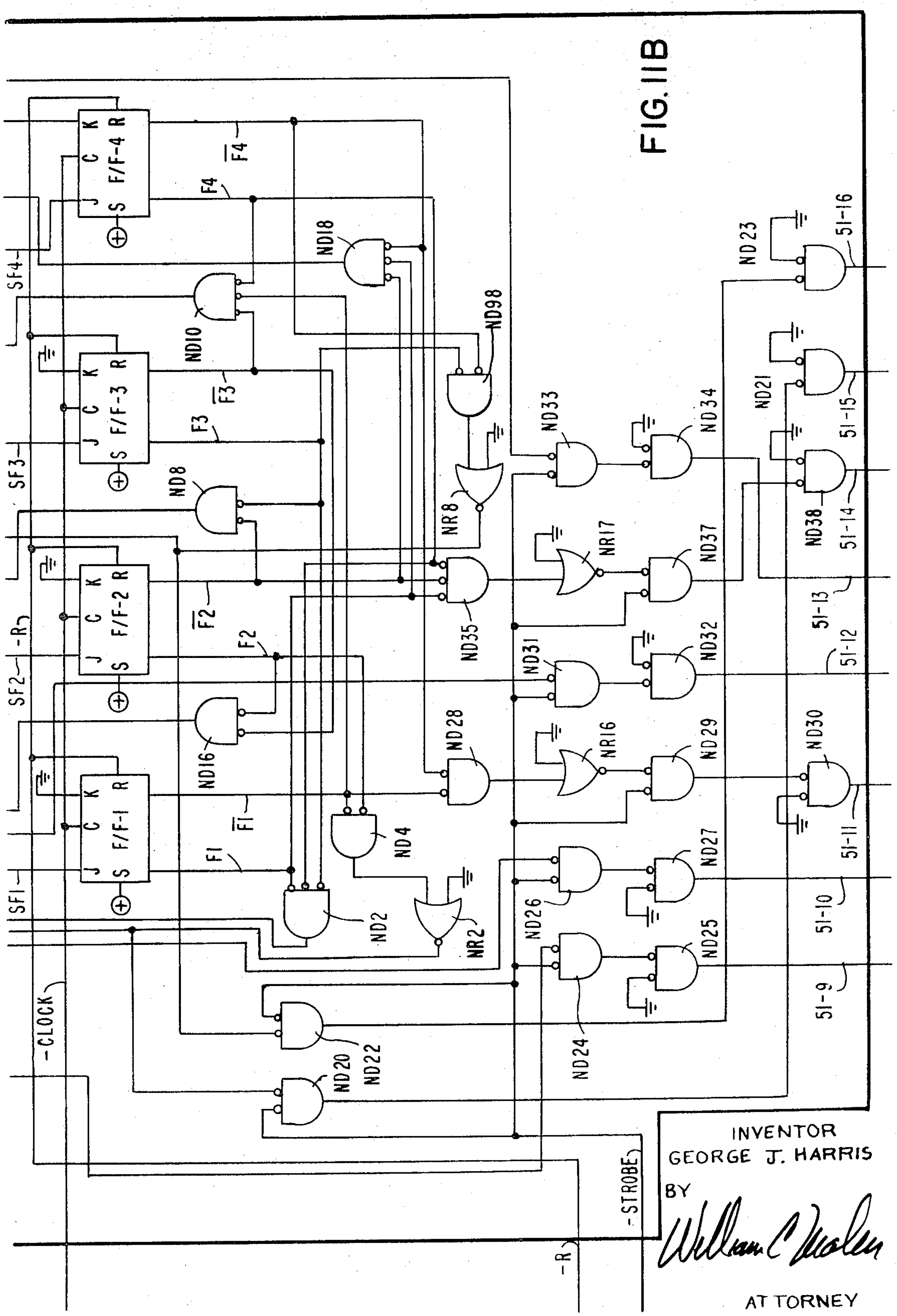

FIGS. 11A and 11B—recognition logic circuit

Recognition logic circuit 50 operates to examine the four flip-flops F/F–A through F/F–D, and depending on the sequence of their energizations during the appearance of any ECG waveform to cause one of the eight output conductors 51–9 through 51–16 to go low. Each of these conductors is normally high in potential and when one of them goes low it is an indication that one of the final system states 9–16, indicated on FIG. 3, has been reached.

Referring to FIG. 3, it is seen that a transition is made to one of the eight terminal states only with the generation of the strobe pulse. Accordingly, one of the eight conductors 51–9 through 51–16 goes low only when the strobe pulse is generated. This pulse is not generated until after the ECG waveform has been analyzed by the recognition logic circuit. While any individual ECG waveform is being examined, during a period typically slightly shorter than a second, flip-flops F/F–A through F/F–D are energized in a sequence dependent upon the shape of the waveform. The recognition logic circuit continuously changes the states of flip-flop F/F–1 through F/F–4 (FIG. 11B) in accordance with both the present states of these flip-flops and the particular sequence in which flip-flops F/F–A through F/F–D are successively set and reset. Depending upon the final states of the former four flip-flops at the time the strobe pulse is generated, one of the eight output conductors 51–9 through 51–16 is energized. The operation of recognition logic circuit 50 is summarized in the state diagram of FIG. 3 and the table of FIG. 4.

The recognition logic circuit includes two types of gates, NAND and NOR. The NAND gates have ND prefixes in their designation, and the NOR gates have NR prefixes. Each gate has two or more input conductors. The NAND gate is of the AND type, but the little circles connecting the input conductors to the gate inputs represent inverters, and effectively convert the basic AND gate to a NAND gate. If all inputs to an AND gate are high, the output is similarly high. If at least one input is low, the output is low. Because each input to the basic AND gate in any NAND gate is inverted, it is apparent that if at least one input is high, the corresponding input to the AND gate is low, and the output of the gate is low. Consequently, only if all inputs are low does the NAND gate output go high. It should be noted that if one input of a two-input NAND gate is grounded, the gate serves as an inverter. If the other input is low, the output is high, and vice versa.

The NOR gate is of the OR type, but the little circle at the gate output represents an inverter. A basic OR gate has its output energized if at least one of its inputs is high. Because of the inverted output of a NOR gate, the output is low if at least one of the inputs is high. The output goes high only if all inputs are low. If a NOR gate has only two inputs, one of which is grounded, it functions as an inverter. If the other input is low, the output is high; if the other input is high, the output is low.

Some of the NAND gates in recognition logic circuit 50 include a symbol such as X→Y. Such a symbol is used to indicate that the gate controls a transition of the system from state X to state Y upon the generation of a clock pulse on conductor —CLK.

Between the detection of successive ECG waveforms, the output of each of multipliers M1 through M4 in FIG. 7 is low. Since the output of each multiplier is connected to the J input of a respective one of flip-flops F/F–A through F/F–D, the J input of each of the flip-flops is low. Since the output of each multiplier is coupled through an inverter to the K input of the corresponding flip-flop, the K input of each flip-flop is high. In such a case, the clock pulses on conductor —CLK keep the flip-flops reset. Conductors A through D are low and conductors $\overline{A}$ through $\overline{D}$ are high. (Actually, outputs A, B, C and D from flip-flops F/F–C and F/F–D are not required, and accordingly the corresponding conductors are not shown in the drawing.) Once a flip-flop is reset by a first clock pulse, the succeeding clock pulses have no effect. The flip-flop remains reset. As soon as a multiplier output goes high, however, the next clock pulse causes the associated flip-flop to be set with a corresponding change in state in the output conductors.

Referring to FIG. 3, it is seen that the system starts off in state 0 with each of flip-flops F/F–1 through F/F–4 being in the 0 state. Conductor —R is connected to the reset terminal of each of the flip-flops. Prior to the analysis of each detected ECG waveform, this conductor goes negative (as will be described below) to reset all four flip-flops. Thus, initially all of conductor $\overline{F1}$, $\overline{F2}$, $\overline{F3}$ and $\overline{F4}$ are high, and all of conductors F1, F2, F3 and F4 are low. The state diagram shows that either one of two inputs, AD or BC, results in a new system state when the system starts off in state 0. Consider the former. In such a case, the outputs of multipliers M1 and M4 go high together and the next clock pulse switches flip-flops F/F–A and F/F–D to the set state. Conductor $\overline{A}$, connected to one input of NAND gate ND1, goes low. Conductor $\overline{D}$, connected to the second input of the gate, similarly goes low. The three inputs of gate ND2 are connected to conductors F1, F3 and F4, all of which are initially low. Consequently, the output of gate ND2 is initially high. Since this output is connected to an input of NOR gate NR1, the output of the gate is initially low. This output is connected to the third input of gate ND1. Thus, as soon as conductors $\overline{A}$ and $\overline{D}$ go low, output conductor SF1 of gate ND1 goes high. Since the output of the gate is connected to the J input of flip-flop F/F–1, and since the K input of this flip-flop is always low, the next clock pulse on conductor —CLK causes the flip-flop to switch to the set (1) state. The output of gate ND1 is connected only to the J input of flip-flop F/F–1 via conductor SF1, and consequently of the four flip-flops F/F–1 through F/F–4, only this flip-flop switches state. As shown in the table of FIG. 4, when flip-flops F/F–1 through F/F–4 assume respective states 1, 0, 0, 0 the overall system is in state 1. The state diagram of FIG. 3 shows that with an AD input the system should switch from state 0 to state 1. The switch is controlled by gate ND1, as shown in FIG. 11A by the notation 0→1 inside the gate.

Assume next that multipliers M2 and M3 energize their outputs together, a BC input to the recognition logic circuit. Conductor $\overline{B}$, connected to one input of gate ND3, goes low. Conductor $\overline{C}$, connected to a second input of this gate, similarly goes low. The two inputs to gate ND4 are connected to conductors $\overline{F1}$ and F2, both of which are low when the system is in state 1. Consequently the output of gate ND4 is high, and since this output is coupled to an input of gate NR2 the output of this gate goes low. The ouput of this gate is connected to the third input of gate ND3, and since all three inputs to this gate are low when the BC input is received, the output of the gate goes high.

Gate ND3 controls the transition from state 1 to state 3 for a BC input, just as gate ND1 controls a transition from state 0 to state 1 for an AD input. The output of gate ND3 is connected to one input of gate NR3, whose output now goes low. Gate ND5 inverts the signal so that conductor SF2, connected to the J input of flip-flop F/F–2, goes high. The next clock pulse following that which controls the switching of flip-flops F/F–B and F/F–C to the 1 state causes flip-flop F/F–2 to switch to the 1 state. The output of gate ND3 is also connected to an input of gate NR4 whose output now goes low. Inverter ND97 causes conductor SF3 to go high, and since this conductor is connected to the J input of flip-flop F/F–3, this flip-flop also switches to the 1 state. Thus, if a BC input is present when a clock pulse is generated, the four flip-flops F/F–1 through F/F–4 switch from respective states 1, 0, 0, 0 to respective states 1, 1, 1, 0. As shown in the table of FIG. 4, the latter four respective states represent system state 3, which is the system state into which the circuit switches when a BC input is received while the system is in state 1.

On the other hand, assume that when the system is in state 1 a C input is received without a B input. As described above, because the system is in state 1 the output of gate NR2 is low. The output of this gate is connected to one of the inputs of gate ND6. The other input to the gate is connected to conductor $\overline{C}$. Consequently, when conductor $\overline{C}$ goes low, the output of gate ND6 goes high. Since the output of this gate is connected to an input of gate NR3, just as the output of gate ND3 is connected to another input of gate NR3, flip-flop F/F–2 switches from the 0 to the 1 state when the output of gate ND6 goes high. It should be noted that flip-flop F/F–3 does not switch state because gate ND3 does not operate during a transition from system state 1 to system state 2. Gate ND3 controls the setting of both flip-flops F/F–2 and F/F–3 to switch the system from state 1 to state 3, while gate ND6 controls the setting of only flip-flop F/F–2 to switch the system from state 1 to state 2. Since only flip-flop F/F–2 changes state, the four flip-flops F/F–1 through F/F–4 assume respective states 1, 1, 0, 0, or as indicated in the table of FIG. 4, system state 2. This is the desired state as shown in the state diagram of FIG. 3 when a C input is received without a D input while the system is in state 1.

Assume next that a B input is received while the C input persists. The table of FIG. 4 and the state diagram of FIG. 3 require that the system switch from state 2 to state 3, which in turn entails the setting of only flip-flop F/F–3. When the system switches from state 1 directly to state 3, gate ND3 operates to control the energization of conductor SF3 (along with conductor SF2) via gates NR4 and ND97. However, when the system is in state 2, gate ND3 can not operate even though coductors $\overline{B}$ and $\overline{C}$ are low because its third input is derived from the output of gate NR2, one of whose inputs is connected to the output of gate ND4. And this latter gate no longer has its output high because when the system is in state 2 conductor F2, one of the inputs of gate ND4, is high. For this reason, a different gate ND7, is provided to control a switching of the system from state 2 to state 3.

Two of the three inputs to the gate are connected to conductors $\overline{B}$ and $\overline{C}$. The third input of the gate is connected to the output of gate NR5, one of whose inputs is grounded and the other of whose inputs is connected to the output of gate ND8. The two inputs to this latter gate, connected to conductors $\overline{F2}$ and F3, are both low when the system is in state 2. Consequently, the gate energizes its output to cause the output of gate NR5 to go low. Gate ND7 operates to cause the output of gate NR4 to go low just as gate ND3, connected to another input gate NR4, causes the output of gate NR4 to go low when the system switches from state 1 to state 3. With the output of gate NR4 low, the output of gate ND97 goes high. Flip-flop F/F–3 is set (with the application of a clock pulse) and the overall system is switched to state 3 as required by both the state diagram of FIG. 3 and the table of FIG. 4.

If the system is in state 3 and a D input is received, as shown in FIG. 3 the system should switch to state 4, and as shown in FIG. 4 this is accomplished by causing flip-flop F/F–4 to be set. With a single input D, conductor $\overline{D}$ is the only one of conductors $\overline{A}$ through $\overline{D}$ which is low. This conductor is connected to one input of gate ND9. The output of gate ND10 is high at this time because its three inputs are connected to conductors $\overline{F1}$, $\overline{F3}$ and F4, all of which are low when the system is in state 3. Gate NR6 inverts the high output of gate ND10, and since the output is connected to the second input of gate ND9, the output of gate ND9 goes high to control the switching of the system from state 3 to state 4. The output of gate ND9 is connected to one input of gate NR7, the output of which goes low. Inverter ND11 causes the J input of flip-flop F/F–4 to go high and the clock pulse which initially causes flip-flop F/F–D to switch to the 1 state similarly causes flip-flop F/F–4 to switch to the 1 state. All of flip-flops F/F–1 through F/F–4 are now in the 1 state, and as indicated in FIG. 4 the system is in state 4—the resultant state when a D input is received when the system is in state 3.

It was assumed above that the first input was AD which controlled a switching of the system from state 0 to state 1. Now assume that the first input is BC rather than AD. As shown in the state diagram of FIG. 3, the system should switch from state 0 to state 5. As shown in the table of FIG. 4, this requires a change only in flip-flop F/F–4 which should switch from the 0 to the 1 state. When conductors $\overline{B}$ and $\overline{C}$ both go low, two of the inputs of gate ND12 go low. The third input is connected to the output of gate NR1. It will be recalled that when the system is in state 0, the output of this gate is low. Consequently, gate ND12 causes its output to go high, and since the output of this gate is connected to one input of gate NR7, the other input of which is connected to the output of gate ND9, the system operation is the same as that which takes place when the output of gate ND9 goes high. Gate ND9 controls the switching of the system from state 3 to state 4, which as seen in the table of FIG. 4, simply entails the switching of flip-flop F/F–4 from state 0 to state 1—the same operation which is now required to control the switching of the system from state 0 to state 5. Consequently, flip-flop F/F–4 switches to the 1 state and the system is placed in state 5.

When the system is in state 5, two possible inputs can be expected—D or AD. Assuming that flip-flops F/F–A and F/F–D both switch to the 1 state together, conductors $\overline{A}$ and $\overline{D}$, connected to two of the inputs of gate ND13, go low. The third input of the gate is connected to the output of gate NR8. While one input of this gate is grounded, the other is connected to the output of gate ND98. The two inputs to this latter gate are connected to conductors F3 and $\overline{F4}$, both of which are low when the system is in state 5. The output of gate ND98 goes high, and the output of gate NR8 goes low. Since all three inputs of gate ND13 are thus low, its output goes high. The output of the gate is connected to an input of gate NR4, which is the gate directly responsible for the switching of flip-flop F/F–3 from the 0 to the 1 state. The output of gate ND13 is similarly connected to an input of gate NR3, which is the gate directly responsible for the switching of flip-flop F/F–2 from the 0 to the 1 state. Consequently, both of flip-flops F/F–2 and F/F–3 switch from the 0 to the 1 state—the two flip-flops which must thus switch to control a system transition from state 5 to state 7 as seen in FIG. 4, and as required by the state diagram of FIG. 3, when an AD input is received while the system is in state 5.

On the other hand, assume that the D input is received before the A input. Conductor $\overline{D}$ is the only one of conductors $\overline{A}$ through $\overline{D}$ which goes low. This conductor is connected to one input of gate ND14. The other input to the gate is connected to the output of gate NR8 which, as described above, is low when the system is in state 5. Consequently, gate ND14 operates to energize one input of gate NR4. Unlike a transition from state 5 to state 7, gate NR4 operates alone rather than with gate NR3. Consequently, only flip-flop F/F–3 changes from the 0 to the 1 state. This is the operation required by the table of FIG. 4 when the system switches from state 5 to state 6.

With the system in state 6 and a D input still present, assume that the A input is received. Conductors $\overline{A}$ and $\overline{D}$ are now both low and since they are connected to two of the inputs of gate ND15, two of the inputs to this gate are low. The third input of the gate is connected to the output of gate NR9. While one input to this gate is grounded, the other is connected to the output of gate ND16. The two inputs to this gate are connected to conductors F2 and $\overline{F3}$, both of which are low when the system is in state 6 as seen in the table of FIG. 4. Consequently, the output of gate ND16 goes high and the output of gate NR9 goes low. Since all three inputs to gate ND15 are now low, one input of gate NR3 is energized. This is the gate which, when any one of its inputs is energized, causes flip-flop F/F–2 to switch from the 0 to the 1 state. This is the only operation required when the system switches from state 6 to state 7, as seen in the table of FIG. 4, which operation is required when an AD input is received while the system is in state 6, as seen from the state diagram of FIG. 3.

With the system in state 7, assume that only a C input is received. Conductor $\overline{C}$ goes low so that one of the inputs of gate ND17 goes low. The other input of this gate is connected to the output of gate NR10, one of whose inputs is grounded and the other of whose inputs is connected to the output of gate ND18. The three inputs of gate ND18 are connected to conductors F1, $\overline{F3}$ and $\overline{F4}$—all of which are low when the system is in state 7 as seen from the table of FIG. 4. The output of gate ND18 thus goes high and the output of gate NR10 thus goes low. The output of gate ND17, connected to the K input of flip-flop F/F–4, goes high. At this time, the J input of the flip-flop is low because gate ND11 does not energize conductor SF4. With the J input of the flip-flop low and the K input of the flip-flop high, the clock pulse on conductor —CLK causes the flip-flop to switch to the 0 state. (This is the only instance in which one of flip-flops F/F–1 through F/F–4 switches from the 1 to the 0 state, other than with the energization of the R terminals of the flip-flops. It is for this reason that the K inputs of flip-flops F/F–1 through F/F–3 are all grounded while the K input of flip-flop F/F–4 is allowed to go high with the operation of gate ND17.) Flip-flops F/F–1 through F/F–3 remain in respective states 0, 1, 1, and as seen from the table of FIG. 4 when flip-flop F/F–4 switches from the 1 to the 0 state, the system switches from state 7 to state 8. As seen from the state diagram of FIG. 3, this is the required operation when a C input is received alone while the system is in state 7.

Depending on the operations of multipliers M1 through M4 (FIG. 7), flip-flops F/F–A through F/F–D continuously change state. Whenever a multiplier output is high, the next clock pulse switches the associated flip-flop to the 1 state. Whenever a multiplier output goes low, the next clock pulse switches the flip-flop back to the 0 state. Flip-flops F/F–A through F/F–D thus represent the instantaneous values of inputs A, B, C, D as represented on FIG. 1. Flip-flops F/F–1 through F/F–4, on the other hand, comprise the memory of the circuit—they represent the instantaneous system state dependent upon the prior sequence of the multiplier energizations, and also control transitions to succeeding states dependent upon the values of the instantaneous inputs. Assuming that the system state initially went from state 0 to either of states 1 or 5, the system can end up in any one of the eight states 1 through 8. When the negative strobe pulse is applied, the system switches to one of the states 9 through 16 from respective ones of initial states 1 through 8 as shown in FIG. 3. This final system state is represented by one of conductors 51–9 through 51–16 going low. Flip-flops F/F–1 through F/F–4 are no longer required for representing the system state. The flip-flops are simply used to control one of conductors 51–9 through 51–16 to go low in accordance with which of states 1 through 8 is represented by the flip-flops when the strobe pulse is generated.

It is necessary at this point to consider how the system reaches the terminal states 9–16. Consider first terminal state 15. One input of gate ND20 (FIG. 11B) is connected to the output of gate NR2. One of the inputs to the latter gate is connected to the output of gate ND4, and the other input is connected to ground. As described above, when the system is in state 1, the output of gate ND4 is high. Consequently, with the system in state 1 the output of gate NR2 goes low. When conductor —STROBE goes negative with the generation of the strobe pulse, the other input of gate ND20 also goes low. The output of gate ND20 goes high, and the signal is inverted by inverter ND21. Consequently, when the system is in state 1, the generation of the strobe pulse results in conductor 51–15 going low to represent terminal system state 15.

Consider next the generation of the strobe pulse while the system is in state 5. The state diagram of FIG. 3 shows that the system should switch to state 16. One input of gate ND22 is connected to the output of gate NR8, one of whose inputs is connected to the output of gate ND98. (The other input of gate NR8 is grounded.) As described above, the output of this gate is low when the system is in state 5. The other input of gate ND22 is connected to conductor —STROBE, and when this conductor goes negative with the generation of the strobe pulse the output of gate ND22 goes high. The signal is inverted by gate ND23 and conductor 51–16 goes low to represent terminal system state 16.

Assume now that the system is in state 2 when the strobe pulse is generated. Referring to the state diagram of FIG. 3, it is seen that the system must switch to a final state 9. As described above, when the system is in state 2 the output of gate NR5 is low. This output is connected to one input of gate ND24. The other input of the gate is connected to conductor —STROBE and when the strobe pulse is generated both inputs to the gate are low. The output goes high but is inverted by gate ND25. Conductor 51–9 goes low as required.

If the system is in state 3 when the strobe pulse is generated, the output of gate NR6 is low. This output is coupled to one input of gate ND26, the other input of which is connected to the —STROBE conductor. When the strobe pulse is generated the output of the gate goes high but is inverted by gate ND27 to cause conductor 51–10 to go low, representing system state 10.

If the strobe pulse is generated when the system is in state 4, referring to the table of FIG. 4 it is seen that flip-flop F/F–1 is in the 1 state and flip-flop F/F–4 is similarly in the 1 state. Only in such a case are both of conductors $\overline{F1}$ and $\overline{F4}$ low. Both of these conductors are coupled to the two inputs of gate ND28 whose output is thus high when the system is in state 4. The output of the gate is coupled to an input of gate NR16, whose output is thus low when the system is in state 4. Since the output of this gate is connected to one input of gate ND29, and the other input of this gate is connected to the —STROBE conductor, with the generation of the strobe pulse the output of gate ND29 goes high. It is inverted by gate ND30 to cause conductor 51–11 to go low, representing a final system state 11.

When the system is in state 6, the output of gate NR9 is low. This output is connected to one input of gate ND31, the other input of which is conected to conductor —STROBE. The strobe pulse causes the output of the gate to go high and the signal to be inverted by gate ND32. Conductor 51–12 goes low to indicate a final system state 12.

If the system is in state 7, the output of gate NR10 is low. The two inputs to gate ND33 are connected to this output and to conductor —STROBE. The strobe pulse causes the output of the gate to go high and the signal to be inverted by gate ND34. Conductor 51–13 goes low to indicate a final system state 13.

Finally, if the system is in state 8 when the strobe pulse is generated, as seen from table of FIG. 4, flip-flop F/F–1 is in the 0 state and flip-flop F/F–4 is in the 0 state. All of conductors F1, $\overline{F2}$ and F4 are low. Since these three conductors are connected to the three input of gate ND35, the output of the gate is high. The outputs is connected to an input of inverter NR17 whose output is low. The output of gate NR17 is connected to one input of gate ND37, the other input to which is connected to conductor —STROBE. The strobe pulse causes the output of gate ND37 to go high, and the signal is inverted by gate ND38 to cause conductor 51–14 to go low, representing a final system state 14.

Depending on the sequence of inputs A, B, C and D, one of conductors 51–9 through 51–16 goes low with the generation of the strobe pulse. The strobe pulse is not generated until after the ECG waveform has terminated. Immediately after the strobe pulse is generated the reset pulse +R is generated. (The timing control circuit 30 will be described below.) This pulse resets all of flip-flops F/F–1 through F/F–4, as described above, to the 0 states so that the recognition logic circuit represents a system state 0. Also, all of flip-flops F/F–A through F/F–D are reset in their 0 states at this time as a result of the first clock pulse which arrived immediately after each respective multiplier output went to zero at the end of the ECG waveform. Consequently, the system is in a condition to determine the nature of the next ECG waveform.

Figure 12A:
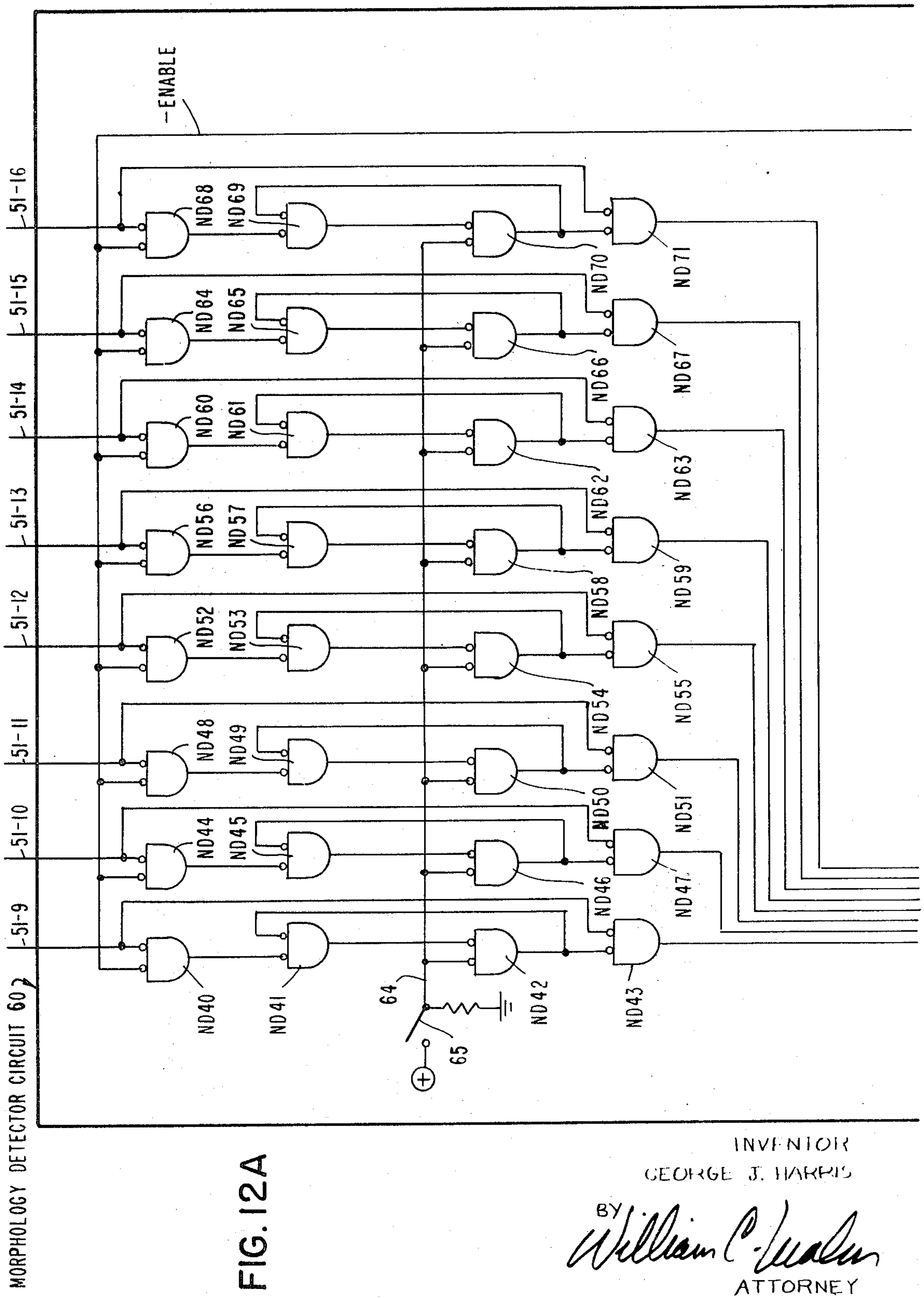
Figure 12B:
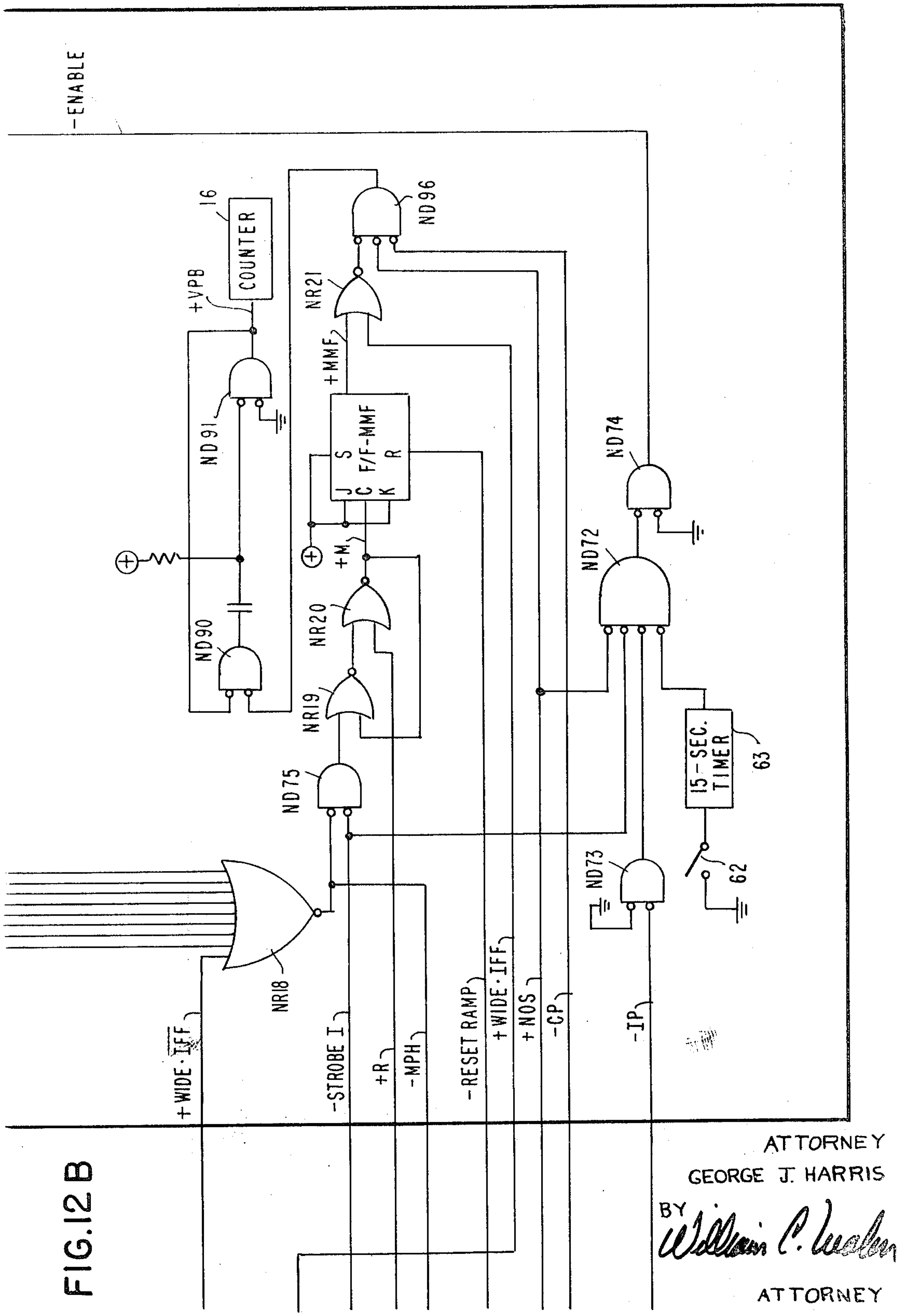

FIGS. 12A and 12B—morphology detector circuit—

Part I

Morphology detector 60 performs two functions. First, It stores the morphology pattern numbers (states 9 through 16) which occur during the learning interval. Second, it compares the stored state numbers with those states occurring later. If a new state occurs which is not one of those stored earlier, flip-flop F/F–MMF is set to indicate that a 3-second trace should be produced.

The states which occur during the learning process are stored in a series of eight flip-flops ND41, ND42; ND45, ND46; ND49, ND50; ND53; ND54; ND57, ND58; ND61, ND62; ND65, ND66; and ND69, ND70. To begin the learning process switch 62 is momentarily closed by the operator. This triggers timer 63 whose output goes low for 15 seconds. The output of the timer is connected to one input of gate ND72. Conductor —IP is ordinarily high and the output of gate ND73 is ordinarily low. Since the output of this gate is connected to another input of gate ND72, a second of the four inputs to the gate is low. Conductor +NOS is low in the absence of noise to enable a third input of gate ND72. Conductor —STROBE I is ordinarily high in potential. However, with the generation of each strobe pulse the conductor goes low. The strobe pulses are continuously generated by timing control circuit 30. Each time a strobe pulse is generated during the 15-second time-out interval of timer 63, the output of gate ND72 goes high. Since the output of the gate is connected to one input of gate ND74, the output of the latter gate goes low with the generation of each strobe pulse during the 15-second learning interval. The output of gate ND74 is connected to the —ENABLE conductor which in turn is coupled to one input of each of the eight NAND gates in the first level of gates on FIG. 12A.

Before the learning process begins, switch 65 is momentarily operated. Conductor 64, which is ordinarily low, goes high at this time. One input to each of the NAND gates on the third level of gates on FIG. 12A goes high. Conductor —ENABLE is high so that the output from each of the eight gates on the first level in the morphology detector is low. Each gate on the second level has two inputs—the outputs of the gates in the same column in the first and third levels. When switch 65 is operated and the output of each gate in the third level goes low, both inputs to each of the gates in the second level are low and the outputs of these gates go high. The high output of each gate in the second level, connected to one of the inputs of the respective gate in the third level, causes the output of the gate in the third level to remain low. In effect, the second and third gates in each column of gates in the morphology detector circuit comprise a flip-flop, and with the operation of switch 65 all of the flip-flops are set such that the output of the gate in the second level is high, and output of the gate in the third level is low. Switch 65 is then released and switch 62 is momentarily operated. This starts the 15-second learning process.

The recognition logic circuit operates during the learning process just as it does during patient monitoring. With the generation of each strobe pulse one of conductors 15–9 through 51–16 goes low. Assume, for example, that the system ends up in state 9 and the conductor 51–9 goes low with the generation of the first strobe pulse during the learning process. Since both inputs to gate ND40 go low, the output goes high. Because the output of the gate is connected to one input of gate ND41, the output of this latter gate goes low. Conductor 64 is also low after switch 65 is released. Both inputs to gate ND42 are thus low and its output goes high. The output of gate ND42, connected to one of the inputs of gate ND41, maintains the output of gate ND41 low. Consequently, the flip-flop comprising gates ND41 and ND42 changes state so that one input of gate ND43 is thereafter held high.

Similarly, any one of conductors 51–10 through 51–16 which goes low with the generation of a strobe pulse during the 15-second learning process results in one input of the respective gate in the fourth level of morphology detector 60 going high and being held high. During the subsequent monitoring, the output of this gate cannot go high because one of its inputs is held high.

But those of conductors 51–9 through 51–16 which do not go low during the learning process have a pair of gates (flip-flop) in the second and third levels whose output, coupled to an input of a respective gate in the fourth level, remains low as a result of the initial resetting of the flip-flops. Each of conductors 51–9 through 51–16 is connected to the second input of the respective gate in the fourth level. If any one of these conductors goes low during the subsequent monitoring, both inputs to the respective gate in the fourth level go low and the output goes high. This is an indication that the system ended up in a state which is not one of those which occurred during the learning process. This should result in a trace.

The learning process is controlled by gate ND72; each time a strobe pulse is generated and conductor —STROBE I goes low, one of the eight possible terminal system states is learned. The state should not be learned, however, in the presence of noise since the state may be due to the noise rather than to the patient's ECG waveform. In the presence of noise, conductor +NOS is high to disable gate ND72. Similarly, conductor —IP goes low, as will be described below, if a premature beat is detected. The signal on the conductor, inverted by gate ND73, also inhibits the operation of gate ND72. The waveforms of premature beats are thus not "learned" as normal waveforms.

All of the outputs of the gates in the fourth level are coupled to inputs of gate NR18. The output of this gate thus goes low when the morphology detector determines that the final state of the system is one other than those which occurred during the learning process. When the output of gate NR18 goes low, one input of gate ND75 goes low. The other input is connected to the —STROBE I conductor which goes low with the generation of a strobe pulse. The output of gate ND75 thus goes high with the generation of the strobe pulse to indicate that a trace is required.

Gate NR18 has nine inputs, only eight of which are connected to the outputs of the NAND gates in the fourth level in the morphology detector. The ninth input is connected to conductor +WIDE·$\overline{\text{IFF}}$. Some ventricular premature beats have QRS complexes which are basically of the same shape as normal QRS waveforms, but are wider and often taller. If such VPB's occur their waveshapes will be treated as normal, since the morphology recognition circuits are not responsive to width and amplitude. They would not result in the operation of gate NR18. To insure that such VPB's are recognized as abnormal, an area detector (to be described below) is provided to measure the area under the rectified ECG signal and to compare it with the average area. When a wide and/or tall waveform is detected, conductor +WIDE·$\overline{\text{IFF}}$ goes high to operate gate NR18. Thus, during subsequent monitoring gate NR18 operates in such a case to cause the output of ND75 to go high even though the waveshape itself of the VPB may be normal for the patient.

The operation of the remainder of the morphology detector circuit will be described below after timing control circuit 30, interval detector circuit 70, and area detector circuit 40 are considered.

Figure 8:
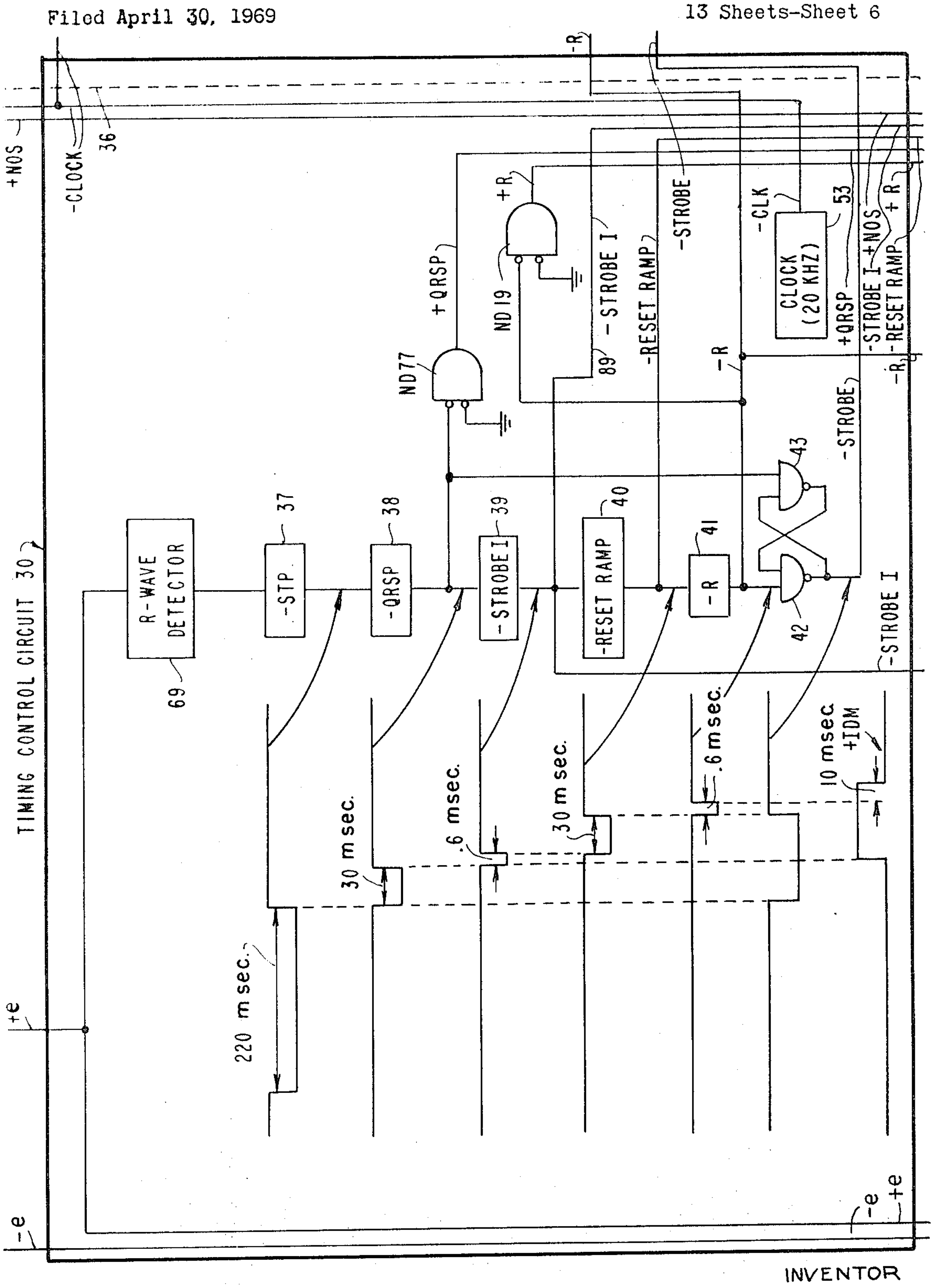

FIG. 8—timing control circuit

The $+e$ output of amplifier 15 on FIG. 7 is coupled to the input of R-wave detector 69 on FIG. 8. The R-wave detector can be any of many well known types. It produces a negative pulse when the downward sloping portion of the QRS complex is detected.

This negative pulse triggers, in sequence, a set of five multivibrators 37–41. Each multivibrator extends a negative pulse to the next multivibrator in the chain, and the trailing edge of each pulse triggers the next multivibrator. The multivibrators are labelled —STP, —QRSP, —STROBE I, —RESET RAMP and —R, and the various pulses generated by the multivibrators are referred to in this description in the same way. Adjacent to the output conductor of each multivibrator there is shown in the drawing a waveform showing the period of the respective pulse and its time relationship to the other pulses generated by the timing control circuit.

AND gates 42 and 43 comprises a flip-flop. Each of these gates is of the type whose output is low only if both of its inputs are high. The output of —QRSP multivibrator 38 is coupled to one input of gate 43. At the leading edge of the —QRSP pulse, this input of gate 43 goes low and consequently the output goes high. The output is coupled to one input of gate 42, the other input to which is coupled to the output of —R multivibrator 41 which is normally high. Consequently, the output of gate 42 goes low, and since this output is coupled to the second input of gate 43, the output of gate 43 remains high even after the —QRSP pulse terminates. Thus, the —STROBE pulse at the output of gate 42 goes low at the leading edge of the —QRSP pulse. When the —R pulse is generated, however, one input of gate 42 goes low. Although the other input, connected to the output of gate 43, is still high, the output of gate 42 is low only when both of its inputs are high. With the generation of the —R pulse, the output of gate 42 goes high. Since the output of gate 42 is coupled to one input of gate 43, one input of this gate is high. The other input, connected to the output of —QRSP multivibrator 38, is also high at this time, and consequently the ouput of gate 43 goes low. Since the output of gate 43 is coupled to one input of gate 42, the output of gate 42 remains high even after the —R pulse terminates. Thus, as shown in the drawing, the —STROBE pulse starts at the leading edge of the —QRSP pulse and terminates at the leading edge of the —R pulse.

A waveform is also shown in timing control circuit 30 which is representative of the +IDM pulse generated in interval detector 70, and to be described below. The waveform for the +IDM pulse is shown in FIG. 8 only so that its timing relative to the other pulses will be understood when it is considered below.

Figure 9:
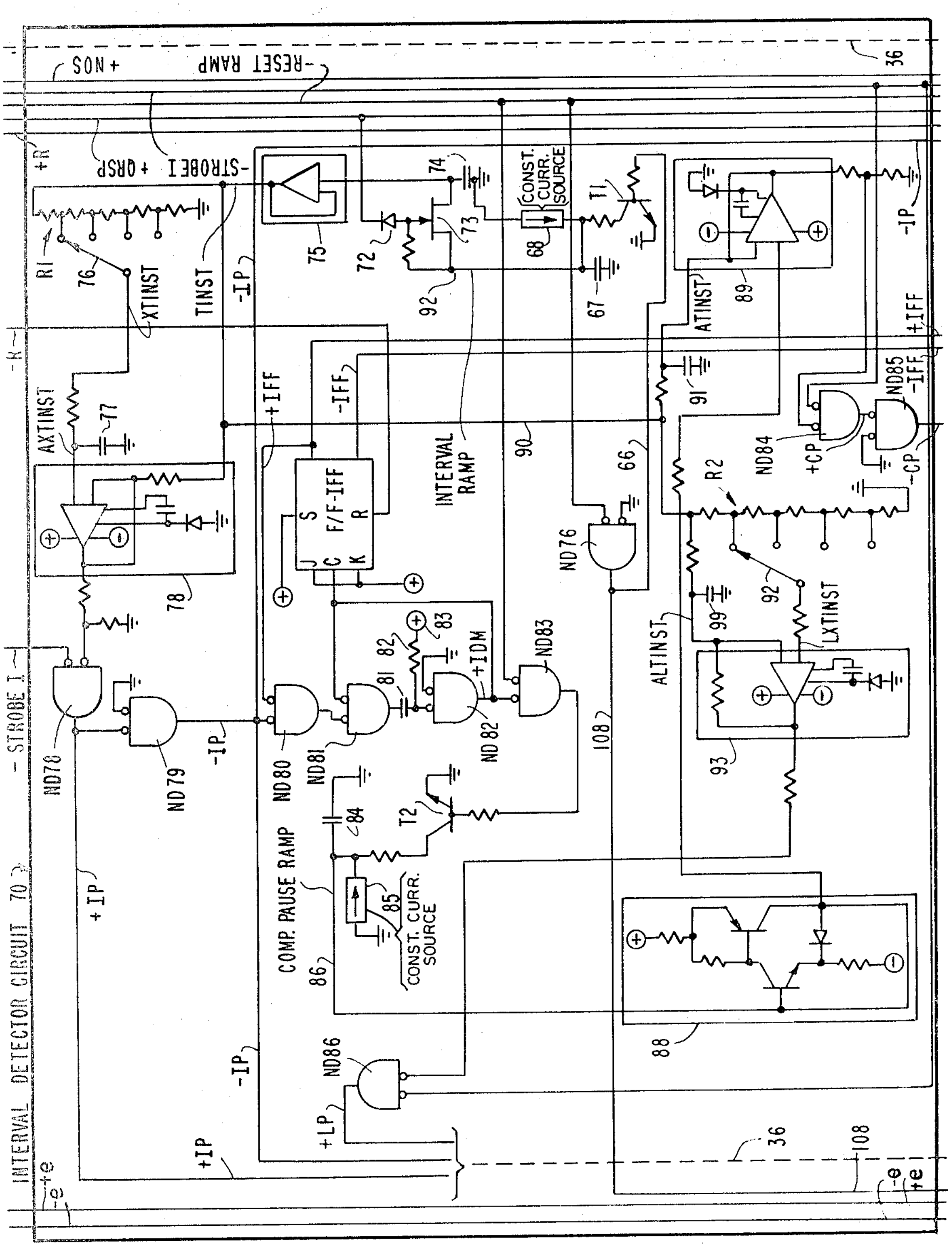

FIG. 9—interval detector circuit

Interval detector circuit 70 functions to derive a number of signals which relate to the timing of the ECG waveforms. The first of these signals is —CP, indicative of a compensatory pause. A premature beat is one which occurs sooner after the preceding beat than it should have occurred. The next beat can follow the premature beat after the normal inter-pulse interval has elapsed, or it can follow the premature beat after a greater than normal time period has elapsed. In the latter case, the period between the premature beat and the next beat often exceeds the normal inter-pulse interval by the same time period by which the premature beat was premature. In other words, the interval between a first beat and the premature beat plus the interval between the premature beat and a third beat equals twice the normal inter-pulse interval. This condition is known as a compensatory pause, and if the condition is detected a —CP signal is generated to control the incrementing of a counter which counts the number of ventricular premature beats which have occurred.

The trailing portion of the QRS wave in each ECG waveform triggers the various multivibrators in timing control circuit 30. The —RESET RAMP pulse, a negative pulse of 30-millisecond duration, occurs once during each waveform period, and it is this pulse which is used to separate the various time interval measurements to determine the spacing between successive heartbeats. The negative pulse on conductor —RESET RAMP is inverted by gate ND76 and the positive pulse on conductor 66 is coupled to the base of transistor T1. The transistor conducts for 30-milliseconds and capacitor 67 discharges through it. As soon as transistor T1 turns off at the end of the —RESET RAMP pulse, constant current source 68 starts to charge the capacitor. The voltage across the capacitor starts to rise linearly and a ramp voltage appears on interval ramp conductor 92.

Figure 5:
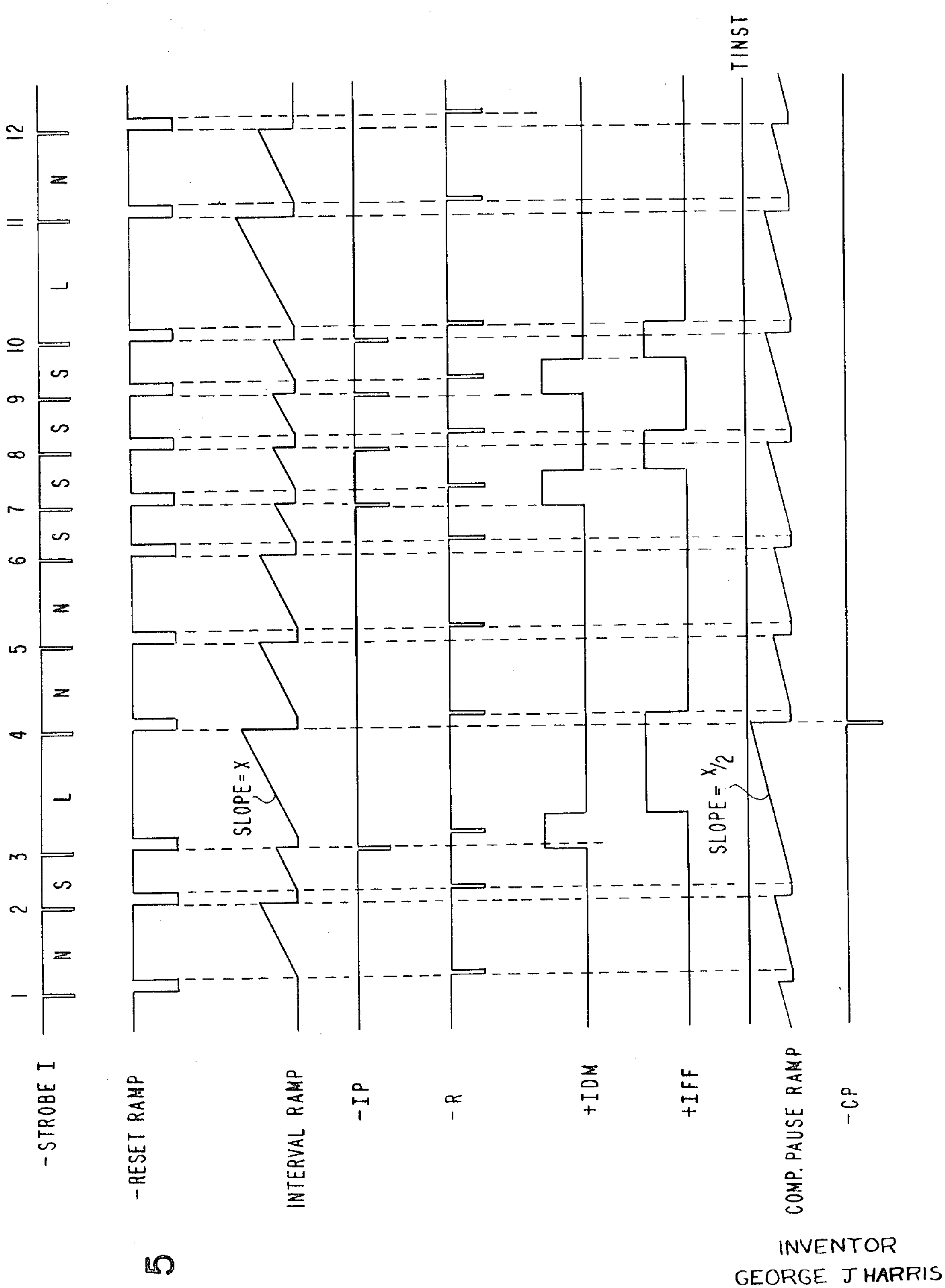
FIG. 5 is a timing diagram which will be helpful in the analysis of the circuitry which determines the occurrence of a compensatory pause.

The various waveforms in FIG. 5 depict the operation of the circuits which generate the —CP signal. The upper waveform is a series of a dozen —STROBE I pulses. One such pulse is generated for each R wave detected by R-wave detector 69 (see FIG. 8). The letters N, S, L separating the various —STROBE I pulses represent respectively normal, short and long inter-pulse intervals. The trailing edge of each —STROBE I pulse triggers the —RESET RAMP multibivrator (FIG. 8) and a 30-millisecond reset ramp pulse is generated. (The various waveforms on FIG. 5 are not drawn to scale.) During each reset ramp pulse, transistor T1 conducts and interval ramp conductor 92 as well as capacitor 67 are shorted to ground through the transistor. As soon as the —RESET RAMP pulse terminates, the voltage across capacitor 67 starts to increase with a slope X, as shown in the third line of FIG. 5. The voltage across the capacitor continues to increase until the start of the next —RESET RAMP pulse at which time it drops to zero.

Before the —RESET RAMP pulse is generated, however, the —QRSP pulse is generated (see FIG. 8). In fact, this pulse is generated even before the —STROBE I pulse. The 30-millisecond negative pulse is inverted by gate ND77 and conductor +QRSP, connected to the cathode of diode 72, goes high. Before the pulse is generated FET switch 73 is held off. However, with the generation of the +QRSP pulse, the switch conducts and the voltage across capacitor 67 is transferred to capacitor 74. The transfer is complete by the end of the +QRSP pulse at which time switch 73 turns off again. The —STROBE I and —RESET RAMP pulses are then generated, capacitor 67 is discharged, and another cycle begins. Effectively, gate 73 and capacitor 74 comprise a sample and hold circuit, the final voltage across capacitor 74 being proportional to the time interval between successive heartbeats.

Voltage follower 75 has a high input impedance so that the voltage across capacitor 74 remains constant between successive +QRSP pulses. The gain of the voltage follower is unity so that the voltage across capacitor 74 appears on conductor TINST. This voltage is impressed across resistor network R1 and, depending on the setting of switch 76, the voltage on conductor XTINST is a predetermined fraction of the voltage on conductor TINST. Capacitor 77 averages the successive voltages appearing on conductor XTINST so that the voltage on conductor AXTINST is the average value of a predetermined fraction of the magnitude of successive voltages on conductor TINST during a number of cycles.

Conductor AXTINST is connected to one input of comparator 78. The other input of the comparator is connected directly to conductor TINST. As long as the voltage on conductor TINST exceeds the voltage on conductor AXTINST, the comparator output is high. If the latter voltage exceeds the former, the comparator output goes low. For example, consider a setting of switch 76 such that the value of X is .8. As long as the voltage on conductor TINST (corresponding to the instantaneous time interval between successive heartbeats) is greater than the voltage on conductor AXTINST (corresponding to the average value of the heartbeat separations multiplied by a factor of .8), the output of comparator 78 is high. However, if a premature beat is detected, that is, it occurs after an interpulse interval less than 80% of the average interpulse interval, the output of comparator 78 goes low. (The value of X can be selected by the cardiologist by manipulating switch 76.)

Since the voltage on capacitor 67 is transferred to capacitor 74 with the generation of each +QRSP pulse, by the end of this pulse comparator 78 has already determined whether a premature beat has occurred. The —STROBE I pulse is generated immediately after the +QRSP pulse (see FIG. 8) to cause one input of gate ND78 to go low. If the output of comparator 78 is low at this time, a +IP pulse is generated at the output of gate ND78. Gate ND79 inverts the pulse, producing a —IP signal. This is shown in the fourth line of FIG. 5 for the five pulses which follow preceding pulses with a shorter (20% in the illustrative example) than normal time separation.

But of these "premature beat" pulses, only the first is followed by a longer than normal inter-pulse interval which is indicative of a compensatory pause. The second, third and fourth short inter-pulse intervals are not followed by longer than normal inter-pulse intervals. The fifth short interval is followed by a longer than normal inter-pulse interval, but this condition is not a true compensatory pause. A —CP pulse should be generated only if a short interval follows a normal or long interval, and is in turn followed by a long interval. Circuitry is provided to distinguish between the various situations.

The —IP output of gate ND79 is connected to one input of gate ND80. This input is normally high. Each —R pulse is applied to the reset terminal of flip-flop F/F–IFF and, even if the flip-flop is in its set (1) state, the —R pulse resets the flip-flop to its 0 state to cause output conductor +IFF to go low. Although this conductor is connected to a second input of gate ND80, because the —IP conductor is normally high, the output of gate ND80, connected to one input of gate ND81, is normally low.

Gates ND81 and ND82 comprise a single-shot multivibrator, the output of gate ND82 ordinarily being low. This output is coupled back to another input of gate ND81 (as well as the clock input of flip-flop F/F–IFF), and since both inputs to the gate are normally low its output is high. Capacitor 81 is thus connected at one end to the high output of gate ND81, and is connected at the other end through resistor 82 to potential source 83. Potential source 83 is connected through resistor 82 to the input of inverter ND82, and it is for this reason that the output of the inverter, +IDM, is ordinarily low.

When the first in any series (one or more) of —IP pulses is generated, both inputs of gate ND80 are low. The output of the gate goes high and causes the output of gate ND81 to go low. A negative step is transmitted through capacitor 81 to the input of inverter ND82 causing its output to go high. The output of gate ND82 remains high until capacitor 81 charges from potential source 83. The net effect is that a 41.2-millisecond +IDM pulse is generated as shown in the sixth line of FIG. 5. The pulse starts with the generation of the —IP pulse, and terminates after 41.2 milliseconds. During these 41.2 milliseconds, the clock input of flip-flop F/F–IFF is high (disabled). The fifth line of FIG. 5 shows the —R pulse, which are generated at the termination of each —RESET RAMP pulse. One such pulse is generated for each detected heartbeat, and in each case where a premature beat is detected the associated —R pulse is generated before the +IDM pulse has terminated (in those cases where a +IDM pulse is generated in the first place, as will be described below).

The seventh line in FIG. 5 represents the state of flip-flop F/F–IFF, and in particular the potential of conductor +IFF. Each reset pulse resets the flip-flop and causes conductor +IFF to go low. In those cases where a +IDM pulse (sixth line of FIG. 5) is generated by a —IP pulse, flip-flop F/F–IFF is set by the trailing edge of the +IDM pulse; the flip-flop has both of its J and K inputs held high, and although it was previously reset by a —R pulse it switches state when its clock input goes low. The flip-flop is reset when the next —R pulse is generated.

Reference should now be made to the fourth through seventh lines of FIG. 5 for an understanding of the circuit operation. The first —IP pulse generated with the third —STROBE I pulse shown in the drawing, following the first short inter-pulse interval, results in the generation of a +IDM pulse. The next —R pulse has no effect on flip-flop F/F–IFF because the flip-flop is already reset, The trailing edge of the +IDM pulse causes the flip-flop to change state, with conductor +IFF going high. The next —R pulse resets the flip-flop.

The second short inter-pulse interval similarly results in the generation of a —IP pulse (with the seventh —STROBE I pulse) and the generation of a +IDM pulse. At the trailing edge of the +IDM pulse, the flip-flop changes state and conductor +IFF goes high as in the first case considered. The third —IP pulse is generated while conductor +IFF is still high. Ordinarily, the generation of a —IP pulse by gate ND79 causes the output of gate ND80 to go high because the other input of gate ND80, connected to conductor +IFF, is normally low. However, because conductor +IFF is now high, the third —IP pulse does not trigger the single shot multivibrator. A third +IDM pulse is not generated for the third —IP pulse. Conductor +IFF remains high and goes low only when the next —R pulse resets the flip-flop.

The fourth —IP pulse (occurring with the ninth —STROBE I pulse) does trigger the multivibrator because by this time flip-flop FF/F–IFF has been reset by the preceding —R pulse. A +IDM pulse is generated, and when it terminates the flip-flop is set once again. As with the third —IP pulse in the drawing, the fifth —IP pulse has no effect on the circuit because flip-flop F/F–IFF is set and gate ND80 is disabled. The flip-flop remains set until the arrival of the next —R pulse at which time conductor +IFF goes low.

The +IDM pulse is applied to one input of gate ND83. The input thus goes high with the generation of every +IDM pulse, but the pulse is only generated for either a single premature beat, or the first premature beat in any pair (see FIG. 5). The second input of gate ND83 is connected to the —RESET RAMP condctor. Ordinarily, the output of gate ND82 is low and with the generation of each —RESET RAMP pulse, both inputs of gate ND83 are low. The output of the gate goes high and since it is connected to the base of transistor T2, the transistor conducts. At that time, capacior 84 discharges through the transistor. At the end of the —RESET RAMP pulse, the output of gate ND83 goes low, transistor T2 turns off, and capacitor 84 starts to charge from constant current source 85. The voltage on the compensatory pulse ramp conductor 86 thus starts to increase linearly.

The ramp voltage on conductor 86 is shown in the eighth line of FIG. 5. The first —RESET RAMP pulse, generated in the absence of a +IDM pulse, causes capacitor 84 to discharge. At the end of the —RESET RAMP pulse the capacitor starts to charge linearly. The second —RESET RAMP pulse causes it to discharge once again. At the end of the second —RESET RAMP pulse, the capacitor starts to charge again. The third —RESET RAMP pulse is generated at a time when the +IDM input of gate ND83 is high. Consequently, gate ND83 is not operated by the —RESET RAMP pulse and capacitor 84 is not discharged by transistor T2. The ramp continues to rise until the fourth —RESET RAMP pulse arrives. By this time, the +IDM pulse has terminated and the capacitor is discharged. The capacitor starts to charge once again at the end of the fourth —RESET RAMP pulse, is discharged by the fifth pulse, starts to charge again, is discharged by the sixth —RESET RAMP pulse, and starts to charge once again.

The seventh —RESET RAMP pulse is applied during the presence of a +IDM pulse and does not result in the discharge of the capacitor. The ramp function continues to increase. The eighth —RESET RAMP pulse is applied by the time the +IDM pulse has terminated, and it causes the capacitor to discharge. It should be noted, however, that while the capacitor continues to charge for two inter-pulse intervals (as it does between the second and fourth —RESET RAMP pulses), the two intervals, between the sixth and eighth heartbeats, are both short. The total interval between the second and fourth heartbeats is greater than the interval between the sixth and eighth heartbeats, and the capacitor voltage, before the capacitor is discharged for the eighth time, does not reach the level reached by the time the fourth heartbeat is detected.

Similarly, the capacitor charges between the eighth and tenth heartbeats, but the total charging period is less than that between the second and fourth heartbeats. Again, the capacitor voltage does not reach the peak value reached by the time the fourth —STROBE I pulse is generated. Following the tenth —RESET RAMP pulse, the capacitor starts to charge once again. This time, a longer than normal inter-pulse interval appears between the tenth and eleventh heartbeats. However, the interval is not as long as that between the second and fourth heartbeats and the capacitor voltage does not reach the maximum level. Between the eleventh and twelfth —RESET RAMP pulses, the capacitor charges to its minimum level.

Even though the interval between the tenth and eleventh —RESET RAMP pulses is as long as that between the third and fourth, the capacitor voltage does not reach the maximum peak level by the time the eleventh —RESET RAMP pulse is generated as it does by the time the fourth —RESET RAMP pulse is generated. This is due to the fact that the capacitor charges continuously between the second and fourth pulses, while it starts from zero with the generation of the tenth pulse. In general, if an even number of premaure beats are detected in sequence, the capacitor starts charging from zero following the last beat. Even though a long inter-pulse interval may occur the capacitor does not charge to the peak value shown in FIG. 5 by the time the next —RESET RAMP pulse discharges it. However, suppose that an odd number of premature beats are detected in sequence. The last beat (consider beat number 9 in FIG. 5) does not result in the discharge of the capacitor and consequently, if it is followed by a long inter-pulse interval, the capacitor would appear to charge to the peak level shown in FIG. 5. Thus, the circuit would appear to register a compensatory pause if a late beat follows an odd number of premature beats, a condition of little medical significance (except, of course, if the odd number of premature beats is unity). However, the circuit does not usually register a compensatory pulse in the case of a late beat following an odd number (3 or greater) of premature beats. By the time a third premature beat occurs in sequence, the system "expects" premature beats—the magnitude of the voltage on conductor AXTINST is relatively low and the voltage on conductor TINST (corresponding to the instantaneous inter-pulse interval) may not be sufficient to trigger comparator 78 to generate a —IP pulse in the first place. While four successive —IP pulses are shown in FIG. 5, this is more for explanatory purposes that it is for indicating the expected operation of the circuit.

The voltage on compensatory pause ramp conductor 86 is transmitted through emitter follower 88 to one input of comparator 89. The voltage on conductor TINST at the output of voltage follower 75 is coupled over conductor 90 to the other input, ATINST, of comparator 89. Because this other input of the comparator is loaded by capacitor 91, the magnitude of the input is the average value of the TINST voltage over a number of cycles. It will be recalled that the TINST voltage is derived in the first place as a result of the charging of capacitor 67 from current source 68. Capacitor 67 is charged each time for a time period equal to the inter-pulse interval. If a compensatory pause condition exists, as described above, it is necessary that a short inter-pulse interval and the following long inter-pulse interval together be equal to twice the average inter-pulse interval. For this reason, capacitor 84 charges from source 85 in such a way that the slope of the compensatory pause ramp is one-half the slope of the interval ramp, as shown by the slopes X and X/2 in FIG. 5. If a true compensatory pause condition exists, the voltage at the output of emitter follower 88 will equal the voltage on conductor ATINST or it will be slightly greater. The output of comparator 89 is normally high. The output of the comparator goes low when the voltage at the output of emitter follower 88 exceeds the voltage on conductor ATINST.

The output of the comparator is coupled to one input of gate ND84. The other input of the gate is connected to the —STROBE I conductor. When the —STROBE I pulse is generated, both inputs of gate ND84 are low (following a compensatory pause) and the output goes high. It should be noted from FIG. 5 that the —STROBE I pulse is generated just before the peak of the compensatory pause ramp has been reached so that almost the full voltage across capacitor 84 is given an opportunity to change the state of the comparator before the comparator state is determined by the —STROBE I pulse. As shown in the compensatory pause ramp waveform of FIG. 5, only if a true compensatory pause condition is present does the voltage across the capacitor reach the value of TINST. With the generation of the —STROBE I pulse, gate ND84 operates to generate a +CP pulse. Gate ND85 inverts the pulse to derive a negative pulse on conductor —CP which is required in morphology detector 60.

It should also be noted that the circuit has been described as requiring a short inter-pulse interval followed by a long inter-pulse interval which exactly equals twice the average inter-pulse interval in order for a —CP pulse to be generated. Actually, the charging rate of capacitor 84 from current source 85 can be adjusted to be slightly in excess of one-half the charging rate of capacitor 67 from source 68. In this manner, a —CP pulse will be generated even if the total interval between the second and fourth —STROBE I pulses in FIG. 5 is slightly less than twice the average inter-pulse interval.

As will be described below, it is also desirable that a signal be generated whenever an inter-pulse interval exceeds the average interval by a predetermined percentage, i.e., whenever a late beat is detected. Such an indication may be required not only if a long interval follows a short one, but even if a long interval follows a normal one. The TINST voltage on conductor 90 is extended to one end of resistor network R2. Depending on the setting of switch 92, a predetermined fraction of the voltage appears on conductor LXTINST, connected to one input of comparator 93. The voltage on this conductor is directly proportional to the last inter-pulse interval, but is less than the value of TINST by a value X, for example, .8. The TINST voltage is exended directly to the other input of comparator 93, but this input is loaded by averaging capacitor 99. Thus, this other input of the comparator, designated ALTINST in FIG. 9, has a voltage on it which is directly proportional to the average value of TINST, or the average value of the inter-pulse interval. As long as the voltage on conductor ALTINST exceeds that on conductor LXTINST, the output of comparator 93 is high. But if the voltage on conductor LXTINST exceeds the voltage on conductor ALTINST, the comparator output goes low, that is, if the instantaneous inter-pulse interval exceeds the average inter-pulse interval by a predetermined percentage. The output of the comparator is coupled to one input of gate ND86. The other input of the gate is coupled to conductor —STROBE I. If the comparator output is low when this conductor goes negative with the generation of the —STROBE I pulse, a positive pulse appears on conductor +LP to indicate that a longer than normal inter-pulse interval has been detected.

It should be noted that the various timing circuits in interval detector 70 are "self-learning." Both comparator 78 and 93, whose operations are required in order for the —CP and +LP pulses to be generated, are controlled by the voltage on conductor TINST. This voltage is in turn proportional to the instantaneous inter-pulse interval. However, one input to each of the comparators is proportional to the average value of the voltage on conductor TINST. As the heartbeat rate of the patient changes, new average values are developed (typically, over an interval of approximately 10 seconds). These average values are then used as the bases for the two comparisons. Thus, slow changes in the heartbeat rate of the patient do not necessarily result in −CP and +LP pulses. It is only when instantaneous timing conditions are detected which differ considerably from the timing conditions of the few preceding heartbeats that one or the other of the two pulses is generated. It should also be noted that a +LP pulse may be generated when a −CP pulse is generated since one of the conditions for the generation of a −CP pulse is that there be a longer than normal inter-pulse interval. Whether a +LP pulse will actually be generated depends on the "sensitivity" of the circuit which is a function of the switch 92 setting.

Figures 10, 13:
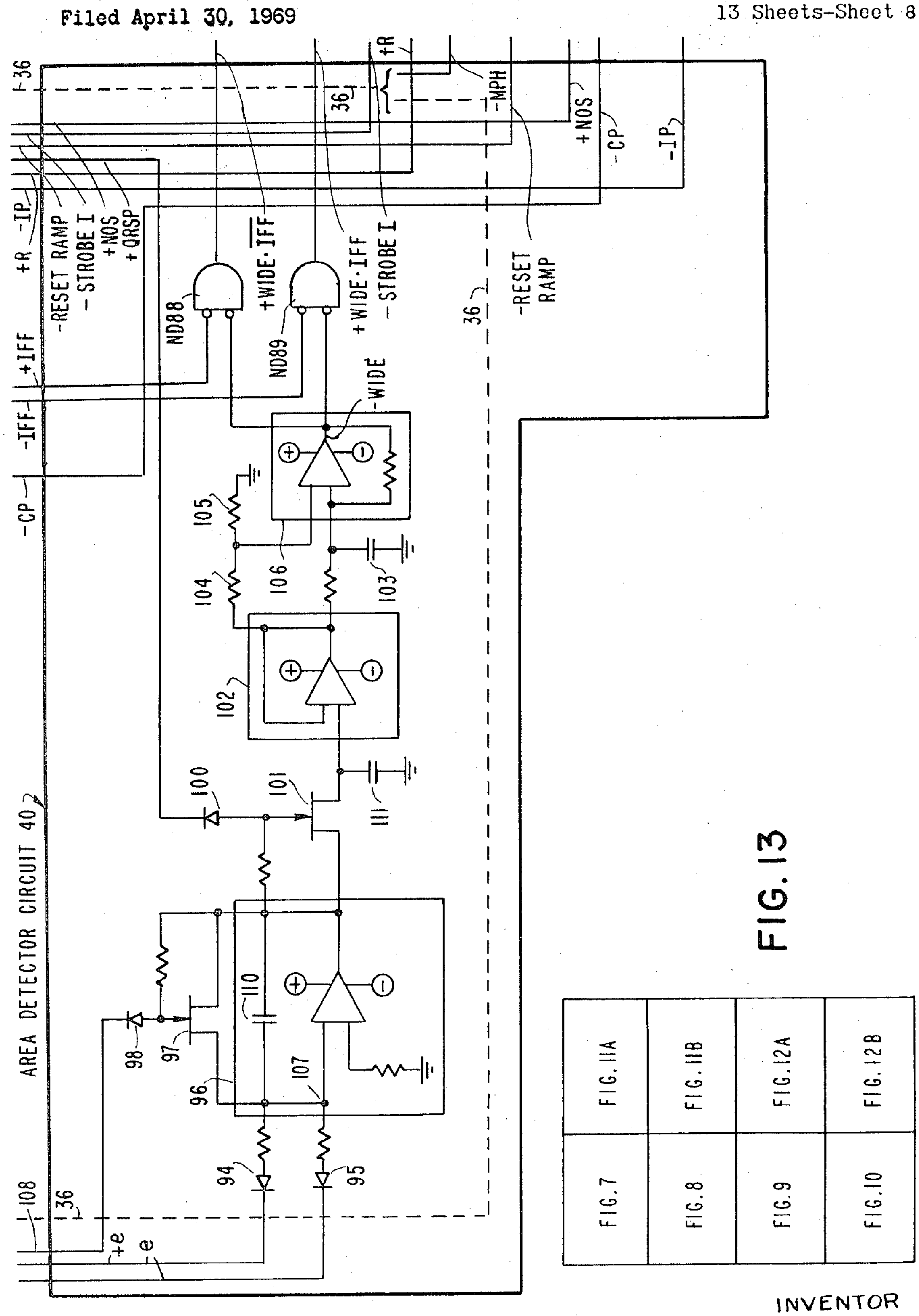
FIG. 13 shows the arrangement of FIGS. 7–12B.

FIG. 10—area detector circuit

Area detector circuit 40 is used to derive a negative potential on conductor −WIDE in the event the total area (after rectification) of any ECG waveform exceeds by more than a predetermined percentage the average value of the area. Some ventricular premature beats (VPB's) are not distorted significantly in shape from normal ECG waveforms, but they do have total areas considerably greater than that of a normal waveform. The −WIDE signal is developed to register an excessive ECG waveform area.

The +*e* and −*e* outputs of amplifier 15 are connected to the cathodes of diodes 94 and 95. These diodes rectify the opposite polarity ECG signals so that the total signal at junction point 107 is a rectified ECG signal. Integrator 96 serves to develop a voltage across capacitor 110 which is a measure of the total area of each rectified ECG waveform. With the application of the −RESET RAMP pulse, conductor 108, connected to the output of gate ND76, goes positive. As long as the conductor is negative diode 98 is forward biased and FET switch 97 is held off. But when the −RESET RAMP pulse is generated, diode 98 turns off and FET switch 97 turns on to discharge capacitor 110. Immediately before the −RESET RAMP puse is generated, however, the +QRSP pulse is generated (see FIG. 8). Ordinarily, diode 100 conducts and FET switch 101 is held off. However, with the generation of the +QRSP pulse, FET switch 101 conducts and transfers the charge from capacitor 110 to capacitor 111. FET switch 101 and capacitor 111 comprise a sample and hold circuit. Voltage follower 102 is provided to ensure that capacitor 111 does not discharge between sampling times. The input impedance of the voltage follower is very high. The output of the voltage follower feeds one input of comparator 106. Capacitor 103 loads this input so that the potential at the input of the comparator is proportional to the average value of the ECG waveform area.

The output of voltage follower 102 is also directly coupled to one end of resistor 104. The junction of resistors 104 and 105 is connected to the second input of comparator 106, and the voltage at the junction is .8 of the instantaneous voltage at the output of voltage follower 102. As long as the voltage at the input of the comparator across capacitor 103 is greater than the voltage at the junction of resistors 104 and 105, the output of the comparator remains high. But as soon as the relative polarities switch, that is, when the average area is less than the instantaneous area by 20%, the −WIDE output of the comparator goes low.

One input of each of gates ND88 and ND89 is connected to the −WIDE output conductor. The other input of gate ND88 is connected to conductor +IFF. If this conductor is low when the output of the comparator goes low, gate ND88 causes the potential on conductor +WIDE·$\overline{\text{IFF}}$ to go high. The other input of gate ND89 is connected to conductor −IFF, and if this conductor is low when the output of the comparator goes low, gate ND89 causes conductor +WIDE·IFF to go high. The +WIDE·$\overline{\text{IFF}}$ and +WIDE·IFF signals are required for the proper operation of the morphology detector. The +WIDE·$\overline{\text{IFF}}$ conductor is the ninth input of NOR gate NR18 and when the conductor goes high, the output of the gate goes low. The +WIDE·IFF pulse is used for another purpose to be described in the next section.

FIGS. 12A and 12B—morphology detector circuit—Part II

Counter 16 in the morphology detector circuit counts the number of VPB's detected, each VPB resulting in conductor +VPB going high. In order for a VPB to be detected, two requirements must be met:

(1) Conductor −CP must go low to indicate that a true compensatory pause condition was detected, *and*

(2) The −WIDE conductor must go low to indicate an excessive ECG area, *or* the shape of the ECG waveform must be one other than those previously learned by the morphology detector during the 15-second learning period.

Gates ND90 and ND91 comprise a single-shot multivibrator which pulses conductor +VPB when the output of gate ND96 goes high. In order for the output of the gate to go high, all three of its inputs must be low. One of these inputs is connected to conductor −CP and this takes care of condition (1) above—counter 16 can be incremented only if there is a negative pulse on conductor −CP. Since the −CP pulse can be generated, if at all, only with the −STROBE I pulse, counter 16 is incremented, if at all, at this time.

The second input to gate ND96 is connected to conductor +NOS. In the presence of noise, this conductor is high in potential to prevent the operation of gate ND96. Counter 16 is not incremented because the operation of gate ND96 otherwise might be due to noise rather than to a true VPB.

The third input of gate ND96 is connected to the output of gate NR21. The output of gate NR21 is ordinarily high, but it goes low when either of the two criteria set forth in condition (2) above are satisfied—the area of a detected ECG waveform exceeds the average area by 20%, or the output of one of the eight gates in the fourth level of NAND gates in the morphology detector is operated.

While condition (2) above can be stated simply, a signal representing its satisfaction is not easily derived. Of course, there is no problem in detecting the output of one of the gates in the fourth level in the morphology detector going high, the first criterion in condition (2). The problem is with the second criterion. The various multivibrators in timing control circuit 30 are triggered by the downward sloping portion of the QRS wave. It is possible for the greatest part of the area under the QRS wave to occur before the detection of the wave, i.e., before R-wave detector 69 has operated. Similarly, the greatest part of the area may occur after R-wave detector 69 has operated. In one case, the large area is essentially determined between a first heartbeat and a premature beat; in the other case, the large area is detected during the compensatory pause interval. Gate ND96 cannot possibly operate until the third waveform in the series is detected because it is only at this time that the −CP pulse is generated. A mechanism must be provided for allowing the −WIDE pulse to cause the output of gate NR21 to go low after the third beat whether the large area condition was detected prior to the premature beat (the middle of the three beats in the series), or after the premature beat (during the compensatory pause interval).

Figure 6:
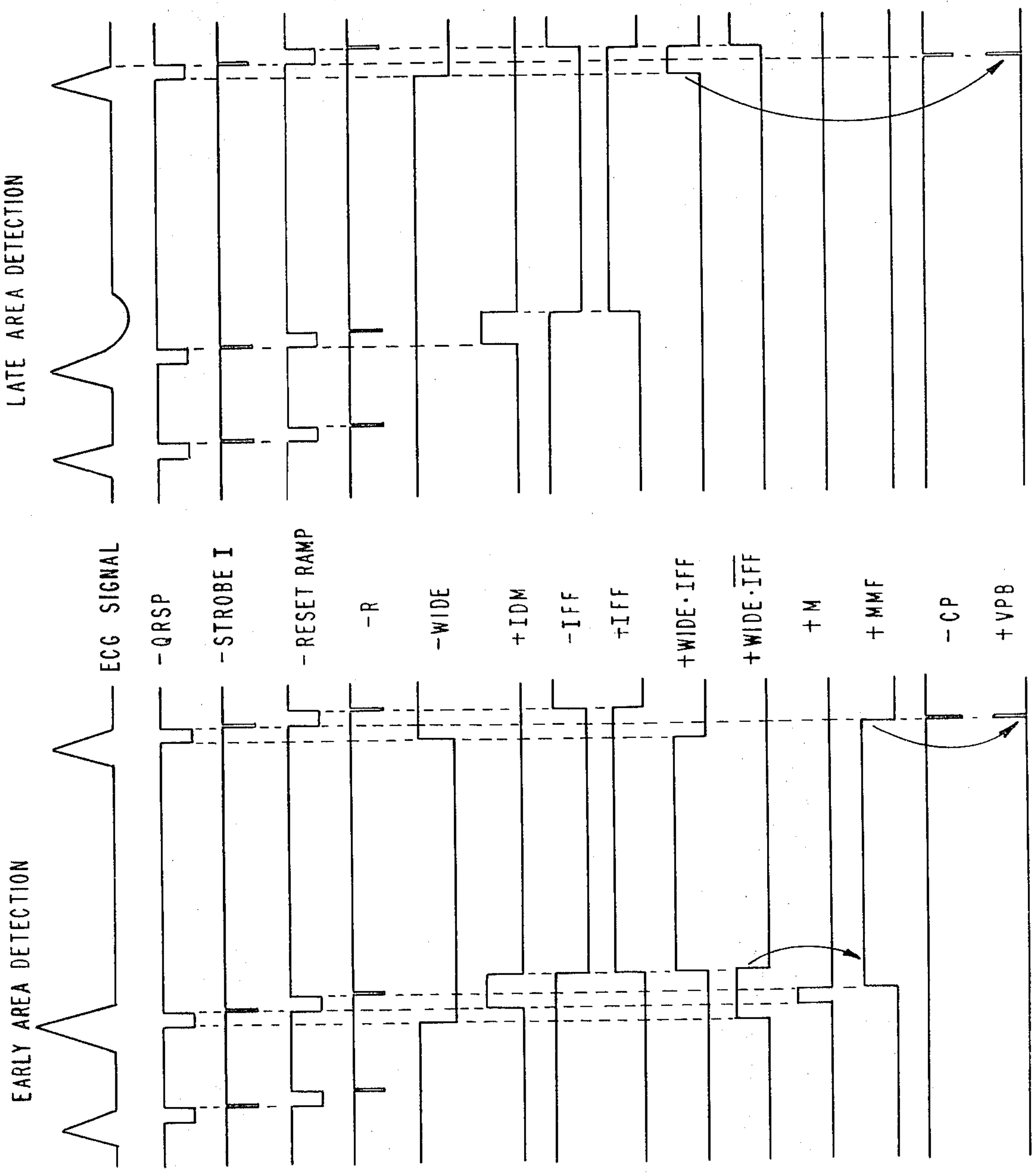
FIG. 6 is a timing diagram which will be helpful in the analysis of the circuitry which determines an abnormality in the width (area) of an ECG waveform.

The overall operation can be best understood by considering the waveforms of FIG. 6. The waveforms show the various pulses generated for a typical "early area detection" (where the width criterion is satisfied before the premature beat) and for a typical "late area detection" (where the width criterion is determined during the compensatory pause interval).

In both cases, during the negative sloping portion of each QRS complex the R-wave detector operates and following the generation of the —STP pulse (FIG. 8), the —QRSP pulse is generated as shown. In each case, the —STROBE I pulse is generated at the end of each —QRSP pulse, and the —RESET RAMP pulse is generated immediately thereafter. The —R pulse is generated at the trailing edge of each —RESET RAMP pulse.

It will be recalled that it is the inverted —QRSP pulse which causes FET switch 101 in area detector 40 to conduct and transfer the charge on capacitor 110 to capacitor 111. The voltage on capacitor 111 immediately manifests itself at the junction of resistors 104 and 105, and consequently if an excessive area has been detected the —WIDE conductor goes low when the —QRSP pulse is first generated. It remains low until the next —QRSP pulse is generated at which time a new sample voltage is transferred to capacitor 111. In the early area detection case, most of the area under the premature beat waveform is detected prior to the generation of the —QRSP pulse. Consequently, the —WIDE conductor goes low at the start of the second —QRSP pulse and it goes high again at the start of the third. In the late area detection case, it is only when the third —QRSP pulse is generated that a large voltage sample is transferred to capacitor 111 to cause conductor —WIDE to go low. Consequently, in the late area detection case, the —WIDE pulse is shown going low beginning with the third —QRSP pulse. Although not shown, the —WIDE conductor goes high again at the start of the fourth —QRSP pulse assuming, of course, that the area of the fourth waveform in the series is not excessive.

As discussed above in connection with interval detector 70, in the case of a premature beat followed by a true compensatory pause, the —IDM pulse is generated together with the —STROBE I pulse associated with the premature beat (see FIG. 5). The +IDM pulse terminates 10 milliseconds after the —R pulse terminates. The same +IDM pulse is shown in FIG. 6 for both cases.

Also as discussed in connection with interval detector 70, flip-flop F/F–IFF is set at the trailing edge of the +IDM pulse and is not reset until the next —R pulse is generated. The +IFF and —IFF waveforms in FIG. 6 represent the state of flip-flop F/F–IFF. The two different, opposite polarity, waveforms are shown since a different one is used to develop the +VPB signal in each of the two cases. The two waveforms represent the same condition—the flip-flop in the 1 state between the trailing edge of the +IDM pulse and the next —R pulse following the detection of a premature beat.

Gate ND89 has two inputs, —WIDE and —IFF, and generates the +WIDE·IFF pulse when both the —WIDE and the —IFF conductors are low. The +WIDE·IFF waveform in FIG. 6, for the late area detection case, is thus high when low portions of both the —WIDE and —IFF waveforms overlap. The overlap is quite small, as shown, but straddles the —STROBE I pulse generated by the third ECG waveform. The overlap is much larger in the early area detection case, but does not straddle a —STROBE I pulse. The +WIDE·$\overline{\text{IFF}}$ conductor goes high when both inputs to gate ND88 go low. One of these inputs is the —WIDE conductor and the other is the +IFF conductor. In the early area detection case, the overlap is small, but the +WIDE·$\overline{\text{IFF}}$ waveform, when positive, straddles a —STROBE I pulse. In the late area detection case, the +WIDE·$\overline{\text{IFF}}$ conductor does not go high until the —R pulse is generated with the third ECG waveform at which time the +IFF conductor goes low. The +WIDE·$\overline{\text{IFF}}$ conductor goes low once again when the —WIDE pulse goes high at the start of the fourth —QRSP pulse.

The +WIDE·$\overline{\text{IFF}}$ conductor is connected to one input of gate NR18. When the conductor goes high the output of gate NR18 goes low. With the application of a —STROBE I pulse, both inputs of gate ND75 go low and the output goes high. Gates NR19 and NR20 comprise a flip-flop whose output conductor +M goes high when the output of gate ND75 goes low. In the early area detection case of FIG. 6, the leading edge of the +M pulse is shown corresponding to the —STROBE I pulse which occurs while the +WIDE·$\overline{\text{IFF}}$ conductor is high. The +R conductor is connected to one of the inputs of gate NR20 and when this conductor goes high the flip-flop is reset with conductor +M going low. Thus, in the early area detection case the trailing edge of the +M pulse is shown coincident with the —R pulse. In the late area detection case, the flip-flop comprising gates NR19 and NR20 is not set in the first place. The flip-flop can be set only when both inputs of gate ND75 are low. Since the +WIDE·$\overline{\text{IFF}}$ conductor is not high at any time when a —STROBE I pulse is generated (the +WIDE·$\overline{\text{IFF}}$ pulse terminates at the start of the fourth —QRSP pulse while the —STROBE I conductor does not go low until the —QRSP pulse has terminated), there is no overlap, the flip-flop is not set, and the +M conductor remains low.

The reset terminal of flip-flop F/F–MMF is connected to the —RESET RAMP conductor, and each —RESET RAMP pulse causes the flip-flop to be reset with conductor +MMF going low. Since a positive potential is connected to both of the J and K inputs, the flip-flop changes state, i.e., is set with conductor +MMF going high, when conductor +M goes low and energizes the clock input. This only takes place in the early area detection case where there is a +M pulse to begin with. As seen in FIG. 6, at the trailing edge of the +M pulse, conductor +MMF goes high. The flip-flop is reset with the application of the next —RESET RAMP pulse, and accordingly the trailing edge of the +MMF pulse in the early area detection case of FIG. 6 is shown corresponding with the leading edge of the third —RESET RAMP pulse.

In both cases, the —CP pulse is generated when a QRS waveform is detected at the end of the compensatory pause (see FIG. 5). In the case of the early area detection, at this time, as shown in FIG. 6, conductor +MMF is high and the output of gate NR21 is low. Since this gate is connected to one input of gate ND96 and the —CP conductor is connected to another (and assuming there is no noise so that conductor +NOS is low), the gate operates and causes a +VPB pulse to be generated. (Although the +MMF waveform is shown going low in FIG. 6 at the same time that the —CP pulse is generated, it will be recalled that the —CP pulse is generated at the start of the —STROBE I pulse.) Flip-flop F/F–MMF is reset by the —RESET RAMP pulse which does not begin until the —STROBE I pulse has terminated. Thus conductor +MMF is high and conductor —CP is low for the duration of the —STROBE I pulse, .6-millisecond. This is a sufficient time for gate ND96 to operate.

On the other hand, assume that the wide area condition was not detected until after the compensatory cause interval elapsed. In this case, the +WIDE·IFF conductor is high when the —CP pulse is generated. Now it is the +WIDE·IFF pulse which energizes one of the inputs of gate NR21 rather than the high potential of conductor +MMF. The result is the same—the output of gate NR21 goes low at the same time that conductor —CP goes low, and a +VPB pulse is generated.

The arrows on FIG. 6 are shown for the purpose of indicating the sequence in the generation of the +VPB pulse in each case. In the early area detection case, the +WIDE·$\overline{\text{IFF}}$ pulse which is generated with the detection of the premature beat, results in the setting of flip-flop F/F–MMF through an intermediary flip-flop which produces a +M pulse. Consequently, the +WIDE·$\overline{\text{IFF}}$ signal in the early area detection case results in conductor +MMF going high, and it is the high potential on this conductor which causes the +VPB pulse to be generated when the —CP pulse appears. In the case of late area detection, on the other hand, the wide area condition is not determined until after the compensatory pause interval, at which time the +WIDE·IFF conductor goes high. Since the high potential on this conductor causes the output of gate NR21 to go low at the same time that the —CP pulse is generated, it is the +WIDE·IFF signal which directly causes the generation of a +VPB pulse.

No matter when the wide area condition is detected, the output of gate NR21 goes low (condition (2) at the beginning of this section) at the same time that conductor —CP goes low (condition (1))—with the detection of the third waveform in the series of three. Counter 16 is incremented to keep track of the total number of VPB's which were detected, but only in the absence of noise when gate ND96 is not inhibited from operating by a high potential on conductor +NOS.

FIG. 7—input and output circuit—Part II

As discussed above, ECG recorder 22 records the ECG signal for three seconds (the ECG signal of the last two seconds as well as the ECG signal of the next second), provided conductor +NOS is not high, when the —DRIVE conductor is energized by 3-second timer 21. The timer is in turn energized when the output of gate NR22 goes low. The gate has four inputs, and when any one of the inputs goes high, the output of the gates goes low.

Depending on the particular patient, the cardiologist may desire a trace only following the occurrence of one or more selected conditions. These conditions are identified by operating switches S1 through S4, all shown in the drawing in the operated positions. Conductor —MPH is connected to the output of gate NR18 in morphology detector circuit 60, and is extended via cable 36 to one input of each of gates ND92 and ND93. This conductor goes low following the operation of gate NR18 by either the +WIDE·$\overline{\text{IFF}}$ conductor going high, or the output of any one of the eight gates in the fourth level in the morphology detector going high. (It will be noted from FIG. 6 that in both early and late area detection cases, conductor +WIDE·$\overline{\text{IFF}}$ goes high at some time, so that gate NR18 operates to generate a —MPH pulse for every pulse morphology of interest.) When conductor —MPH goes low, the output of gate ND93 goes high and the positive potential is extended through switch S4 and gate NR22 to trigger timer 21. Consequently, if switch S4 is operated, a trace will be initiated whenever the shape of the QRS waveform is different from those previously learned, or if a premature beat of wide area was detected.

The —MPH conductor is also coupled to one input of gate ND92. The other input to this gate is the —IP conductor which goes low following the detection of any premature beat. If switch S1 is operated, a trace will be initiated when any premature beat is detected provided gate NR18 has operated as well. Of course, if switch S4 is operated there is no need to operate switch S1, since anytime the output of gate ND92 goes high the output of gate ND93 must necessarily go high as well.

The +IP conductor is coupled directly through switch S2, if it is operated, to another input of gate NR22. If switch S2 is operated, a trace will be initiated for every premature pulse detected, i.e., whenever a pulse arrives after an inter-pulse interval less than the average interval by an amount dependent upon the setting of switch 76 in interval detector 70. Of course, if switch S2 is operated there is no need to operate switch S1, because a positive potential must be extended through switch S2 whenever it is extended through switch S1.

Finally, conductor +LP can be extended through switch S3 to the fourth input of gate NR22. Conductor +LP goes high whenever the time interval between two successive pulses is greater than the average inter-pulse interval by an amount dependent upon the setting of switch 92 in interval detector 70.

The cardiologist can pre-program the apparatus to produce a trace only for those detected conditions of interest to him. These conditions vary from patient to patient, and to prevent excessive traces the cardiologist is given the option to limit the conditions which trigger a trace.

Figure 14:
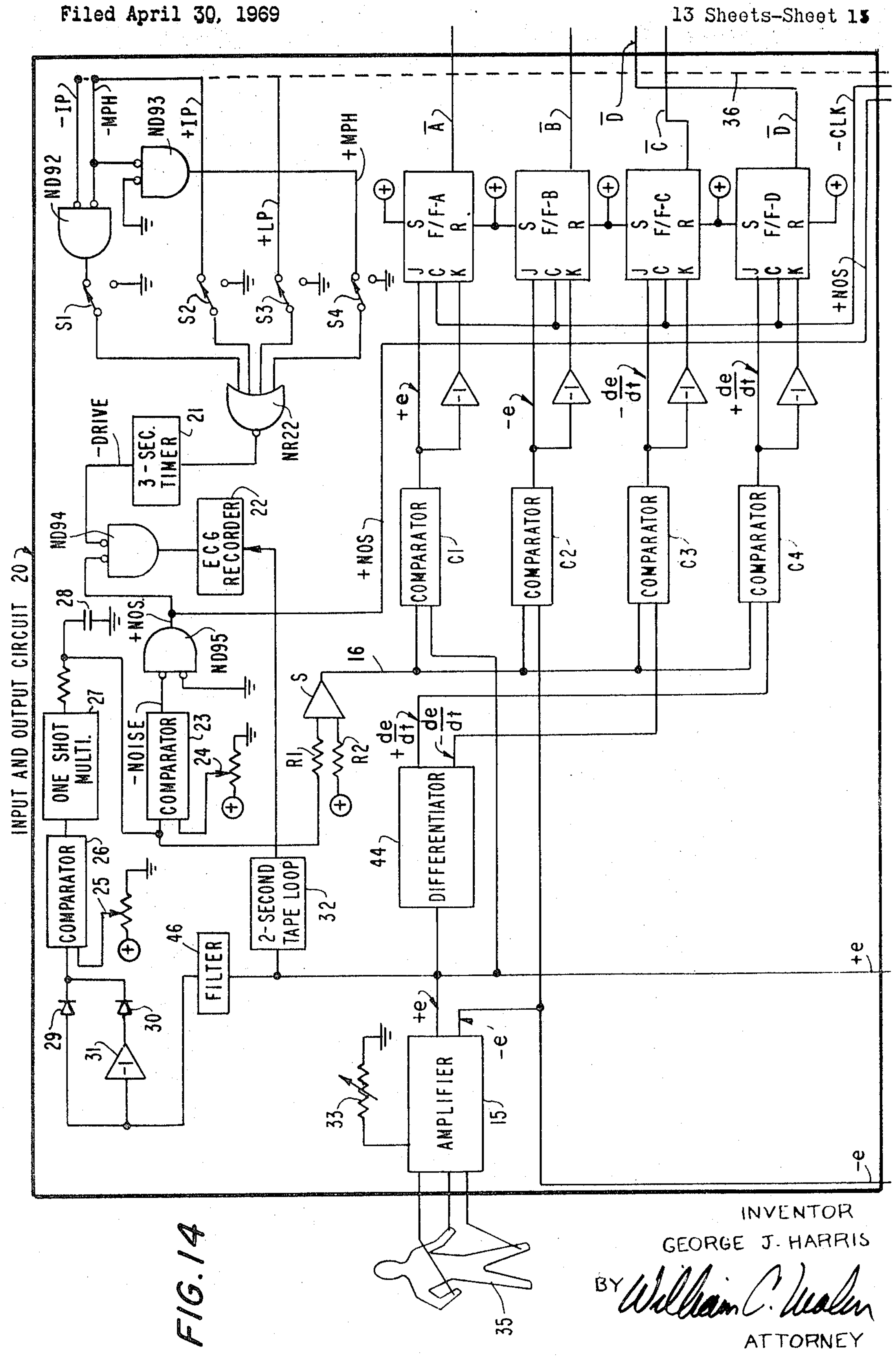
FIG. 14 is a slightly different input and output circuit which can be used in lieu of that shown in FIG. 7.

FIG. 14—alternative input and output circuit

In the circuit of FIG. 7, the output of multipliers M1–M4 are extended to the inputs of flip-flops F/F–A through F/F–D in order to derive the $\overline{A}$–$\overline{D}$ signals. These four signals represent various characteristics of a monitored ECG waveform, and the sequence in which they change state is used to characterize the morphology of the waveform. As described above, each of the four signals is a function of a product—either the square of a derivative or a product of an ECG signal and its derivative.

It is possible, however, to simplify the input and output circuit 20 of FIG. 7 to a considerable extent. The simplification is based on the following two observations:

(1) Each of multipliers M1–M4 has a threshold value, that is, the state of the associated one of flip-flops F/F–A through F/F–D does not change unless the respective signal exceeds a predetermined threshold value. Thus, with respect to flip-flops F/F–A and F/F–C, each flip-flop changes state only if the respective squared derivative function exceeds a threshold value. But if any squared function exceeds a predetermined threshold value, the function itself must also exceed another threshold value, this other threshold value being the square root of the original threshold value. For this reason, to verify the presence of signal A or C, it is only necessary to compare the positive or negative derivative function with a respective threshold value.

(a) The B and D signals are each a function of an ECG signal and its derivative. Consider signal A. This signal is a function of both $+e$ and $+de/dt$. Referring to the state diagram of FIG. 3, it is apparent that the A signal is not used alone in the system. The A signal, if it has any effect on the cycling of the system state, must be accompanied by a D signal. The D signal is in turn a function of the square of $+de/dt$, which as described above is simply a function of $+de/dt$. For this reason, a new A signal can be made a function of $+e$ only, since the information contained in the second factor ($+de/dt$) of the old A signal in FIG. 7 is always represented by the state of the D signal, and the A signal serves no purpose unless it is accompanied by a D signal. Similar remarks apply to the B and C signals—since the B signal serves a function only when accompanied by the C signal, and the C signal represents the necessary $-de/dt$ information, the B signal itself may be made a function of only the $-e$ signal.

The circuit of FIG. 14 includes four comparators C1–C4. Each of these comparators has as one of its inputs a respective one of the $+e$, $-e$, $+de/dt$ and $-de/dt$ signals. The output of each comparator is connected directly, and through an inverter, to one of the four flip-flops F/F–A through F/F–D. For the moment, consider that the second input of each comparator connected to conductor 16 is held at a fixed threshold level. In such a case, conductor $\overline{A}$ is normally high in potential and goes low only when the $+e$ signal exceeds the threshold level. Similarly, conductors $\overline{B}$, $\overline{C}$ and $\overline{D}$ are normally high, and go low only when the respective signals, $-e$, $-de/dt$ and $+de/dt$, exceed the fixed threshold level. The four signals $\overline{A}$–$\overline{D}$ serve the same functions in the circuit of FIG. 14 as they do in the original system in which the circuit of FIG. 7 is used. The $\overline{C}$ and $\overline{D}$ signals generated by the circuit of FIG. 14 contain the same information as the $\overline{C}$ and $\overline{D}$ signals generated by the circuit of FIG. 7. The $\overline{A}$ and $\overline{B}$ signals generated by the circuit of FIG. 14 do not contain the same information as the $\overline{A}$ and $\overline{B}$ signals generated by the circuit of FIG. 7 because in the case of FIG.

14 the two signals are functions of the $+e$ and $-e$ signals alone, rather than their derivatives as well. However, the derivative information is reflected in the $\overline{C}$ and $\overline{D}$ signals, and since the $\overline{A}$ signal has an effect on the Recognition Logic Circuit only if it is accompanied by a $\overline{D}$ signal, and the $\overline{B}$ signal has an effect on the Recognition Logic Circuit only if it is accompanied by a $\overline{C}$ signal, the overall system operates in the same way.

The circuit of FIG. 14 is less costly than that of FIG. 7 because comparators are generally cheaper than multipliers. I have found, however, that the use of comparators C1–C4, rather than multipliers M1–M4, makes the system more sensitive to noise. In the presence of noise, the comparators generate false $\overline{A}$–$\overline{D}$ signals to an extent greater than that encountered with the use of the multipliers of FIG. 7. For this reason, instead of holding each of the threshold inputs of comparators C1–C4 at a fixed level, each of these inputs is controlled by the voltage across capacitor 28. It will be recalled that voltage across this capacitor is proportional to the amount of noise in the input signal. The fixed threshold level of each comparator is adjusted in accordance with the voltage across the capacitor. The greater the amount of noise, the greater the threshold level for each comparator. In this manner, the comparators are made less sensitive to noise. While it is possible that in the case of a noisy signal some of the waveforms will not be recognized due to the comparators not functioning, this is more desirable than having the comparators operate in the wrong sequence.

The function is implemented as shown on FIG. 14 with the use of resistors R1 and R2, and summing amplifier S. Resistor R2 connects a fixed potential source to one input of amplifier S, thus providing a fixed voltage threshold component on conductor 16. Resistor R1 connects capacitor 28 to the other amplifier input, thus providing a variable voltage threshold component on conductor 16, this variable component increasing with noise in the input signal.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What is claimed is:

1. An electrocardiographic monitoring system comprising means for deriving a signal which is a function of and different from an entire electrocardiographic waveform, means for generating at least two signals each of which is a function of at least a respective one of said electrocardiographic waveform and said derived signal, means for determining the sequence in which a selected characteristic of each of said generated signals changes relative to the other of said generated signals, and means responsive to said determining means for characterizing said electrocardiographic waveform.

2. An electrocardiographic monitoring system in accordance with claim 1 wherein said determining means includes means for detecting when the magnitudes of said generated signals exceed threshold values and means for registering the sequence in which said generated signals exceed and fall below said threshold values.

3. An electrocardiographic monitoring system in accordance with claim 2 wherein said registering means includes means for representing a system state, and means for periodically changing the system state represented by said registering means in accordance with the present system state and the instantaneous operations of said detecting means.

4. An electrocardiographic monitoring system in accordance with claim 3 further including means for resetting said registering means to represent an initial system state prior to the monitoring of every electrocardiographic waveform and wherein any electrocardiographic waveform is characterized in accordance with the final system state represented by said registering means following the monitoring of said electrocardiographic waveform.

5. An electrocardiographic monitoring system in accordance with claim 4 further including means for identifying all of the final system states represented by said registering means during a learning interval, and means thereafter for generating an output signal responsive to any final system state represented by said registering means being different from all of those identified during said learning interval.

6. An electrocardiographic monitoring system in accordance with claim 5 wherein said signal deriving means includes means for differentiating an electrocardiographic waveform.

7. An electrocardiographic monitoring system in accordance with claim 6 further including means for detecting the presence of high frequency noise in an electrocardiographic waveform and in response thereto for preventing the operation of said identifying means.

8. An electrocardiographic monitoring system in accordance with claim 6 further including means for detecting the presence of high frequency noise in an electrocardiographic waveform and in response thereto for inhibiting the generation of said output signal.

9. An electrocardiographic monitornig system in accordance with claim 6 further including means for detecting the presence of high frequency noise in an electrocardiographic waveform and in response thereto for inhibiting the generation of said output signal.

10. An electrocardiographic monitoring system in accordance with claim 6 further including means for detecting a premature electrocardiographic waveform and in response thereto for inhibiting the operation of said identifying means.

11. An electrocardiographic monitoring system in accordance with claim 6 further including means for deriving a rectified signal of an electrocardiographic waveform, means for producing an integral of said rectified electrocardiographic signal and for deriving a signal proportional to said integral, means for generating an average integral, and means for generating said output signal in response to said integral signal for any electrocardiographic waveform exceeding said average integral for a number of successive electrocardiographic waveforms by a predetermined amount.

12. An electrocardiographic monitoring system in accordance with claim 5 further including means for detecting a premature electrocardiographic waveform and in response thereto for inhibiting the operation of said identifying means.

13. An electrocardiographic monitoring system in accordance with claim 5 further including means for detecting the presence of high frequency noise in an electrocardiographic waveform and in response thereto for inhibiting the operation of said identifying means.

14. An electrocardiographic monitoring system in accordance with claim 4 wherein said signal deriving means includes means for differentiating an electrocardiographic waveform.

15. An electrocardiographic monitoring system in accordance with claim 1 wherein said signal deriving means includes means for differentiating an electrocardiographic waveform.

16. An electrocardiographic monitoring system in accordance with claim 1 wherein said characterizing means is operative to characterize each electrocardiographic waveform as one of a predetermined group of anticipated waveforms and further including means responsive to the operation of said characterizing means during a learning interval for identifying each of the anticipated waveforms which characterizes monitored electrocardiographic waveforms, and means thereafter for generating an output signal responsive to said characterizing means characterizing any monitored electrocardiographic waveform as one of said anticipated waveforms other than those identified during said learning interval.

17. An electrocardiographic monitoring system in accordance with claim 16 further including means for detecting the presence of high frequency noise in an electrocardiographic waveform and in response thereto for preventing the generation of said output signal.

18. An electrocardiographic monitoring system in accordance with claim 16 further including means for temporarily storing monitored electrocardiographic waveforms for a predetermined time interval, and means responsive to the generation of said output signal for recording the temporarily stored electrocardiographic waveforms.

19. An electrocardiographic monitoring system in accordance with claim 16 further including means for deriving a rectified signal of an electrocardiographic waveform, means for producing an integral of said rectified electrocardiographic signal and for deriving a signal proportional to said integral, means for generating an average integral, and means for generating said output signal responsive to said integral signal for any electrocardiographic waveform exceeding by a predetermined amount the average of the integral signals for a number of successive electrocardiographic waveforms.

20. An electrocardiographic monitoring system comprising means for differentiating an electrocardiographic waveform, means for forming at least two signals one factor of each signal being a differentiated electrocardiographic waveform and the other factor being a function of said electrocardiographic waveform, and means responsive to the relative instantaneous characteristics of the formed signals for characterizing an electrocardiographic waveform.

21. An electrocardiographic monitoring system in accordance with claim 20 wherein said signal forming means forms four signals and includes means for deriving a first factor which is the positive portion of an electrocardiographic waveform, a second factor which is the negative portion of an electrocardiographic waveform, a third factor which is the positive portion of a differentiated electrocardiographic waveform and a fourth factor which is the negative portion of a differentiated electrocardiographic waveform, said first formed signal comprising the product of said first and third factors, said second formed signal comprising the product of said second and fourth factors, said third formed signal comprising the square of said third factor and said fourth formed signal comprising the square of said fourth factor.

22. An electrocardiographic monitoring system in accordance with claim 21 wherein said characterizing means includes means for registering the sequence in which said four signals exceed and fall below threshold values.

23. An electrocardiographic monitoring system in accordance with claim 20 wherein said characterizing means includes means for registering the sequence in which said formed signals exceed and fall below threshold values.

24. An electrocardiographic monitoring system in accordance with claim 23 wherein said characterizing means is operative to characterize each electrocardiographic waveform as one of a predetermined group of anticipated waveforms and further including means responsive to the operation of said characterizing means during a learning interval for identifying each of the anticipated waveforms which characterizes monitored electrocardiographic waveforms, and means thereafter for generating an output signal responsive to said characterizing means characterizing any monitored electrocardiographic waveform as one of said anticipated waveforms other than those identified during said learning interval.

25. An electrocardiographic monitoring system in accordance with claim 24 further including means for deriving a rectified signal of an electrocardiographic waveform, means for producing an integral of said rectified electrocardiographic signal and for deriving a signal proportional to said integral means for generating an average integral, and means for generating said output signal in response to said integral signal for any electrocardiographic waveform exceeding by a predetermined amount the average of the integral signals for a number of successive electrocardiographic waveforms.

26. An electrocardiographic monitoring system in accordance with claim 24 further including means for measuring the interval between successive electrocardiographic waveforms, means responsive to said measuring means for determining the average interval between a number of successive electrocardiographic waveforms, and means responsive to said measuring means measuring the interval between any two successive electrocardiographic waveforms as being less than the average interval by more than a predetermined amount for generating a signal indicative of a premature beat.

27. An electrocardiographic monitoring system in accordance with claim 24 further including means for measuring the interval between successive electrocardiographic waveforms, means responsive to said measuring means for determining the average interval between a number of successive electrocardiographic waveforms, and means responsive to said measuring means measuring the interval between any two successive electrocardiographic waveforms as being greater than the average interval by more than a predetermined amount for generating a signal indicative of a late beat.

28. An electrocardiographic monitoring system in accordance with claim 27 further including means responsive to said measuring means measuring the interval between any two successive electrocardiographic waveforms as being less than the average interval by a predetermined amount for generating a signal indicative of a premature beat, and means responsive to the generation of a premature beat signal followed by the generation of a late beat signal for the next monitored electrocardiographic waveform for registering a compensatory pause condition.

29. An electrocardiographic monitoring system in accordance with claim 28 further including means for inhibiting the operation of said compensatory pause registering means if generated premature beat signal is preceded by another premature beat signal for the immediately preceding monitored electrocardiographic waveform.

30. An electrocardiographic monitoring system in accordance with claim 22 wherein said characterizing means is operative to characterize each electrocardiographic waveform as one of a predetermined group of anticipated waveforms and further including means responsive to the operation of said characterizing means during a learning interval for identifying each of the anticipated waveforms which characterizes monitored electrocardiographic waveforms, and means thereafter for generating an output signal responsive to said characterizing means characterizing any monitored electrocardiographic waveform as one of said anticipated waveforms other than those identified during said learning interval.

31. An electrocardiographic monitoring system as recited in claim 20 and wherein said function of said electrocardiographic waveform comprises said differentiated electrocardiographic waveform.

32. An electrocardiographic monitoring system as recited in claim 20 and wherein said function of said electrocardiographic waveform comprises said electrocardiographic waveform.

33. An electrocardiographic monitoring system comprising means for detecting selected characteristics of an electrocardiographic waveform, means for registering the instantaneous presence and absence of said characteristics, means for defining one of at least five system states and operative to cycle from one system state to another system state in accordance with the present system state and the operation of said registering means, means for resetting said system state defining means prior to the detection of each electrocardiographic waveform, and means for characterizing each detected electrocardiographic waveform in accordance with the terminal system state of said system state defining means prior to the resetting thereof.

34. An electrocardiographic monitoring system in accordance with claim 33 wherein said detecting means includes means for forming signals dependent upon both the instantaneous amplitude of an electrocardiographic waveform and the rate of change thereof, and said registering means are operative to represent said formed signals exceeding predetermined threshold values.

35. An electrocardiographic monitoring system in accordance with claim 34 further including means for identifying all of the terminal system states represented by said system state defining means during a learning interval, and means thereafter for generating an output signal responsive to any terminal system state of said system state defining means being different from all of those identified during said learning interval.

36. An electrocardiographic monitoring system in accordance with claim 35 wherein said system state defining means includes a plurality of flip-flops each having 0 and 1 states with the states of all of said flip-flops defining said system state, and said system state defining means is operative to switch the states of individual ones of said flip-flop in accordance with both the present states of said flip-flops and the operation of said registering means.

37. An electrocardiographic monitoring system in accordance with claim 36 wherein said identifying means includes a group of flip-flops for identifying all of the terminal system states of said plurality of flip-flops during said learning interval, and said output signal generating means is operative to generate an output signal responsive to any terminal system state of said system state defining means being different from all of those identified by said group of flip-flops.

38. An electrocardiographic monitoring system in accordance with claim 34 wherein said system state defining means includes a plurality of flip-flops each having 0 and 1 states with the states of all of said flip-flops defining said system state, and said system state defining means is operative to switch the states of individual ones of said flip-flops in accordance with both the present states of said flip-flops and the operations of said registering means.

39. An electrocardiographic monitoring system comprising means for measuring the area of an electrocardiographic waveform, means for determining the average area of a number of successive electrocardiographic waveforms, and means responsive to the instantaneous area of an electrocardiographic waveform deviating from said average area by more than a predetermined amount for generating an output signal.

40. An electrocardiographic monitoring system for detecting ventricular premature beats comprising means for detecting electrodiographic waveforms, means for measuring the time interval between successive electrocardiographic waveforms, means for deriving the average time interval between successive electrocardiographic waveforms over a number of cycles, means for comparing the measured time interval to said average time interval, means responsive to said comparing means for detecting premature and late beats, means for registering a compensatory pause condition in response to said detecting means first detecting a premature beat and immediately thereafter detecting a late beat, means for measuring the area of each detected electrocardiographic waveform, means for deriving the average area of successive electrocardiographic waveforms over a number of cycles, means for comparing the measured area to said average area and in response to said measured area exceeding said average area by a predetermined amount for registering a wide pulse condition, and means responsive to the registering of a compensatory pause condition and a wide pulse condition for generating a ventricular premature beat signal.

41. An electrocardiographic monitoring system in accordance with claim 40 further including means for characterizing the shape of each of said electrocardiographic waveforms, means for registering the shapes characterized during a learning interval, means for generating a morphology pulse responsive to the characterized shape of any electrocardiographic waveform being other than those registered during said learning interval, and means for generating said ventricular premature beat signal responsive to the generation of said morphology pulse and the registering of said compensatory pause condition.

42. An electrocardiographic monitoring system in accordance with claim 41 further including means for temporarily storing successive electrocardiographic waveforms, and means selectively responsive to the generation of said morphology pulse and the detection of premature and late beats for recording the temporarily stored electrocardiographic waveforms.

43. An electrocardiographic monitoring circuit for detecting large area electrocardiographic waveforms comprising means for forming an area signal proportional to the area of each monitored electrocardiographic waveform, means for forming an average signal proportional to the average of the area signals for a series of successive waveforms, and means responsive to the area signal for any electrocardiographic waveform exceeding the average signal by more than a predetermined amount for generating an output signal.

44. An electrocardiographic monitoring system in accordance with claim 43 wherein said area signal forming means includes means for rectifying an electrocardiographic waveform and means for integrating the rectified electrocardiographic waveform.

45. A system for monitoring and analyzing the rate of an electrocardiographic signal comprising means for detecting successive electrocardiographic waveforms, means for deriving an interval signal which is a function of the time interval between successive detected electrocardiographic waveforms, means for forming an average signal proportional to the average of the interval signals for a series of successive inter-waveform intervals, and means for generating a late beat signal responsive to said average signal being less than an interval signal by more than a predetermined amount.

46. A system in accordance with claim 45 wherein said interval signal deriving means includes a first capacitor, means for charging said capacitor at a fixed rate for a time interval dependent upon the time interval between successive detected electrocardiographic waveforms and means for discharging said first capacitor at the end of each of said time intervals, and said average signal forming means includes a second capacitor and means for charging said second capacitor to an extent dependent upon the charge on said first capacitor following each charging of said first capacitor.

47. A system in accordance with claim 45 further including means for generating a premature beat signal responsive to said average signal exceeding an interval signal by more than a predetermined amount, and means for registering a compensatory pause condition responsive to the generation of a late beat signal following a premature beat signal for two successive monitored electrocardiographic waveforms.

48. A system in accordance with claim 47 further including means for inhibiting the registering of a compensatory pause condition if a late beat signal is generated following two premature beat signals for three successive monitored electrocardiographic waveforms.

49. An electrocardiographic monitoring system for characterizing individual electrocardiographic waveforms in an electrocardiographic signal comprising means for deriving a signal which is the derivative of said electrocardiographic signal, means for forming a plurality of information signals in accordance with the instantaneous values of said electrocardiographic signal and said derivative signal, means for determining the sequence in which said information signals exceed threshold levels, and means responsive to said determining means for characterizing each electrocardiographic waveform in accordance with the sequence in which said information signals exceed said threshold levels.

50. An electrocardiographic monitoring system in accordance with claim 49 further including means for registering each type of electrocardiographic waveform characterized during a predetermined time interval.

51. An electrocardiographic monitoring system in accordance with claim 50 further including means for comparing each electrocardiographic waveform characterized by said characterizing means with the electrocardiographic waveforms registered in said registering means, and means for indicating the characterizing of an electrocardiographic waveform as other than those registered in said registering means.

52. An electrocardiographic monitoring system in accordance with claim 51 further including means for adjusting said threshold levels in accordance with the noise present in said electrocardiographic signal.

53. An electrocardiographic monitoring system in accordance with claim 51 wherein said plurality of information signals include the positive portion of said electrocardiographic signal, the negative portion of said electrocardiographic signal, the positive portion of said derivative signal and the negative portion of said derivative signal.

54. An electrocardiographic monitoring system in accordance with claim 51 further including means for detecting noise in said electrocardiographic signal above a predetermined level, and means responsive to the detection of noise above said predetermined level for inhibiting the operation of said indicating means.

55. An electrocardiographic monitoring system in accordance with claim 51 further including means for adjusting said threshold levels in accordance with the noise present in said electrocardiographic signal.

56. An electrocardiographic monitoring system in accordance with claim 51 wherein said plurality of information signals include the positive portion of said electrocardiographic signal, the negative portion of said electrocardiographic signal, the positive portion of the said derivative signal and the negative portion of said derivative signal.

57. A circuit for detecting excessive noise in an electrocardiographic signal comprising filter means for attenuating low-frequency components of said signal relative to high-frequency components of said signal, means for detecting each time the magnitude of the filtered electrocardiographic signal goes from below a threshold value to above said threshold value, and means responsive to the operation of said detecting means a number of times within a fixed time interval greater than a predetermined number of times for generating a signal indicative of the presence of excessive noise.

58. A circuit in accordance with claim 57 wherein said signal generating means includes means for generating a fixed-width, fixed-amplitude pulse response to each operation of said detecting means, means for producing time average of said generated pulses, and means for comparing the time-average of said generated pulses with a predetermined threshold level.

References Cited

UNITED STATES PATENTS

| | | | |
|---|---|---|---|
| 3,123,768 | 3/1964 | Burch et al. | 128—2.06 R |
| 3,174,478 | 3/1965 | Kahn | 128—2.06 F |
| 3,438,368 | 4/1969 | Karsh | 128—2.06 A |
| 3,510,765 | 5/1970 | Baessler | 128—2.06 A |
| 3,518,983 | 7/1970 | Jorgensen | 128—2.06 A |

WILLIAM E. KAMM, Primary Examiner